United States Patent
Xu et al.

(10) Patent No.: US 9,918,262 B2
(45) Date of Patent: Mar. 13, 2018

(54) METHOD AND APPARATUS FOR FORWARDING DATA FOR SMALL CELL IN WIRELESS COMMUNICATION SYSTEM

(71) Applicant: LG ELECTRONICS INC., Seoul (KR)

(72) Inventors: Jian Xu, Seoul (KR); Daewook Byun, Seoul (KR); Insun Lee, Seoul (KR); Kyungmin Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 103 days.

(21) Appl. No.: 14/903,045

(22) PCT Filed: Jul. 3, 2014

(86) PCT No.: PCT/KR2014/005945
§ 371 (c)(1),
(2) Date: Jan. 5, 2016

(87) PCT Pub. No.: WO2015/002477
PCT Pub. Date: Jan. 8, 2015

(65) Prior Publication Data
US 2016/0165499 A1 Jun. 9, 2016

Related U.S. Application Data

(60) Provisional application No. 61/843,072, filed on Jul. 5, 2013.

(51) Int. Cl.
*H04Q 7/00* (2006.01)
*H04W 36/04* (2009.01)
(Continued)

(52) U.S. Cl.
CPC ....... *H04W 36/04* (2013.01); *H04W 36/0016* (2013.01); *H04W 36/0033* (2013.01);
(Continued)

(58) Field of Classification Search
CPC ............. H04W 36/04; H04W 36/0016; H04W 36/0033; H04W 36/02; H04W 36/023; H04W 84/045
(Continued)

(56) References Cited

U.S. PATENT DOCUMENTS 9,338,711 B2 * 5/2016 Wu ................... H04W 36/0005
2008/0310367 A1 12/2008 Meylan
(Continued)

FOREIGN PATENT DOCUMENTS

EP 2343920 7/2011

OTHER PUBLICATIONS

U.S. Appl. No. 61/753,914, filed Jan. 17, 2013.*
(Continued)

*Primary Examiner* — Chuong T Ho
(74) *Attorney, Agent, or Firm* — Lee Hong Degerman Kang Waimey

(57) ABSTRACT

A method and apparatus for forwarding data in a wireless communication system is provided. A small cell receives an indication which indicates stopping serving a small cell service from a macro eNodeB (eNB). Upon receiving the indication, the small cell starts to forward data to the macro eNB together with a sequence number (SN) status transfer message. The indication may be received via a form of a message or a form of an information element (IE) in a message.

14 Claims, 21 Drawing Sheets

(51) Int. Cl.
*H04W 36/02* (2009.01)
*H04W 36/00* (2009.01)
*H04W 84/04* (2009.01)

(52) U.S. Cl.
CPC .......... *H04W 36/02* (2013.01); *H04W 36/023* (2013.01); *H04W 84/045* (2013.01)

(58) Field of Classification Search
USPC .................................................. 370/331, 332
See application file for complete search history.

(56) References Cited

U.S. PATENT DOCUMENTS

| | | | |
|---|---|---|---|
| 2011/0143759 A1 | 6/2011 | Choi et al. | |
| 2011/0261785 A1 | 10/2011 | Kwon et al. | |
| 2014/0019581 A1* | 1/2014 | Baillargeon | H04W 28/12 709/217 |
| 2015/0264621 A1* | 9/2015 | Sivanesan | H04W 36/0055 455/436 |
| 2015/0341984 A1* | 11/2015 | Wang | H04W 92/20 370/329 |
| 2015/0351139 A1* | 12/2015 | Zhang | H04W 52/0251 370/329 |
| 2016/0373980 A1* | 12/2016 | Yu | H04W 36/0077 |

OTHER PUBLICATIONS

PCT International Application No. PCT/KR2014/005945, Written Opinion of the International Searching Authority dated Sep. 30, 2014, 1 page.
Japan Patent Office Application No. 2016-523665, Office Action dated Jan. 20, 2017, 3 pages.
CATT, "Discussion on U-plane delay", R2-131873, 3GPP TSG RAN WG2 Meeting #82, May 2013, 7 pages.
Alcatel-Lucent, "Possibility of re-ordering deactivation on a peer HO basis", R2-082139, 3GPP TSG-RAN WG2 #62, May 2008, 2 pages.
Nokia Siemens Networks, "Pseudo-CR on Adding End Marker message to GTPv1-U", C4-082871, 3GPP TSG CT WG4 Meeting #40-bis, Oct. 2008, 2 pages.
Ericsson, "Alignment of X2 Release Resource name to S1 naming", R3-080336, 3GPP TSG-RAN WG3 Meeting 059, Feb. 2008, 8 pages.
European Patent Office Application Serial No. 14820643.6, Search Report dated Dec. 15, 2016, 9 pages.
Canadian Intellectual Property Office Application Serial No. 2,917,271, Office Action dated Dec. 9, 2016, 3 pages.
3rd Generation Partnership Project (3GPP), "Technical Specification Group Radio Access Network; Evolved Universal Terrestrial Radio Access (E-UTRA); Study on Small Cell Enhancements for E-UTRA and E-UTRAN—Higher layer aspects (Release 12)," 3GPP TR 36.842 V0.2.0, May 2013, 38 pages.
Huawei, "Analysis of Latency Related Issues for UP Protocol Alternatives", R2-131786, 3GPP TSG-RAN WG2 Meeting #82, May 2013, 6 pages.
Samsung, "Discussion on inter-ENB Carrier Aggregation", R2-131833, 3GPP TSG-RAN WG2 Meeting #82, May 2013, 5 pages.
Nokia, "Email Discussion Report on U-Plane Alternatives [81bis#19]", R2-131621, 3GPP TSG-RAN WG2 Meeting #82, May 2013, 40 pages.
Nokia, "Handover procedure in case of bearer only served by SeNB (1A)", R3-132101, 3GPP TSG-RAN WG3 Meeting #82, Nov. 2013, 13 pages.
Huawei, "Xn functions overview", R3-131654, 3GPP TSG-RAN WG3 Meeting #81bis, Oct. 2013, 3 pages.

* cited by examiner

FIG. 3
(Prior Art)
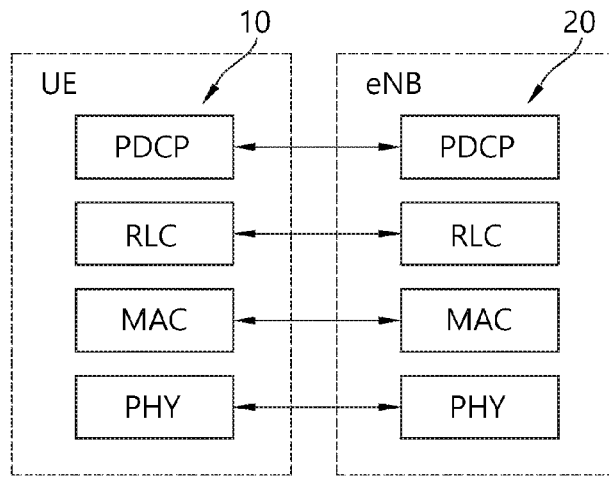
(a)
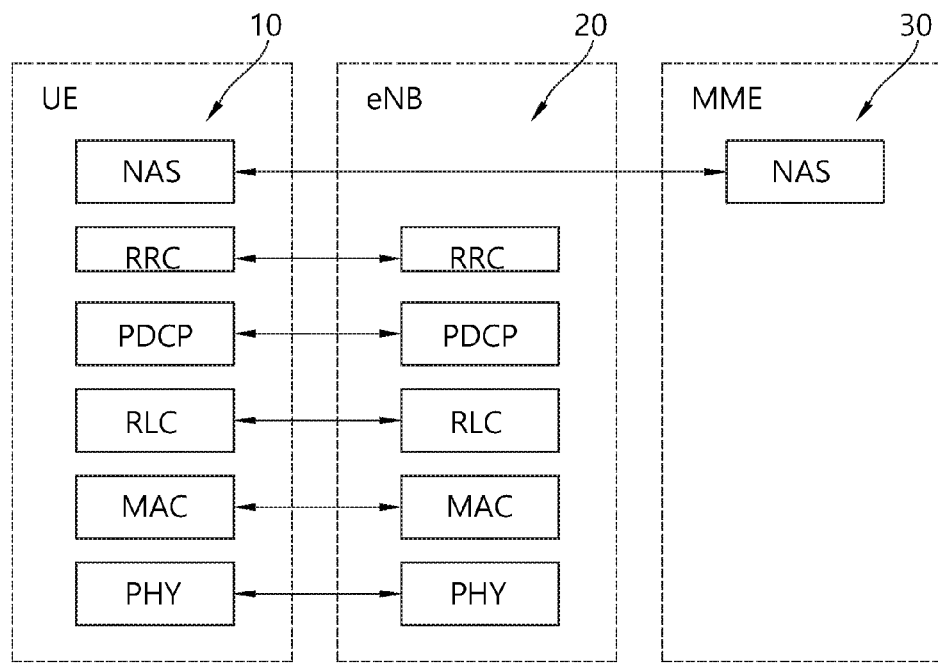
(b)

Handover-like or moving one service to other cell

METHOD AND APPARATUS FOR FORWARDING DATA FOR SMALL CELL IN WIRELESS COMMUNICATION SYSTEM

CROSS-REFERENCE TO RELATED APPLICATIONS

This application is the National Stage filing under 35 U.S.C. 371 of International Application No. PCT/KR2014/005945, filed on Jul. 3, 2014, which claims the benefit of U.S. Provisional Application No. 61/843,072, filed on Jul. 5, 2013, the contents of which are all hereby incorporated by reference herein in their entirety.

BACKGROUND OF THE INVENTION

Field of the Invention

The present invention relates to wireless communications, and more particularly, to a method and apparatus for forwarding data for a small cell in a wireless communication system.

Related Art

Universal mobile telecommunications system (UMTS) is a 3rd generation (3G) asynchronous mobile communication system operating in wideband code division multiple access (WCDMA) based on European systems, global system for mobile communications (GSM) and general packet radio services (GPRS). The long-term evolution (LTE) of UMTS is under discussion by the 3rd generation partnership project (3GPP) that standardized UMTS.

The 3GPP LTE is a technology for enabling high-speed packet communications.

Many schemes have been proposed for the LTE objective including those that aim to reduce user and provider costs, improve service quality, and expand and improve coverage and system capacity. The 3GPP LTE requires reduced cost per bit, increased service availability, flexible use of a frequency band, a simple structure, an open interface, and adequate power consumption of a terminal as an upper-level requirement.

FIG. 1 shows LTE system architecture. The communication network is widely deployed to provide a variety of communication services such as voice over internet protocol (VoIP) through IMS and packet data.

Referring to FIG. 1, the LTE system architecture includes one or more user equipment (UE; 10), an evolved-UMTS terrestrial radio access network (E-UTRAN) and an evolved packet core (EPC). The UE 10 refers to a communication equipment carried by a user. The UE 10 may be fixed or mobile, and may be referred to as another terminology, such as a mobile station (MS), a user terminal (UT), a subscriber station (SS), a wireless device, etc.

The E-UTRAN includes one or more evolved node-B (eNB) 20, and a plurality of UEs may be located in one cell. The eNB 20 provides an end point of a control plane and a user plane to the UE 10. The eNB 20 is generally a fixed station that communicates with the UE 10 and may be referred to as another terminology, such as a base station (BS), a base transceiver system (BTS), an access point, etc. One eNB 20 may be deployed per cell. There are one or more cells within the coverage of the eNB 20. A single cell is configured to have one of bandwidths selected from 1.25, 2.5, 5, 10, and 20 MHz, etc., and provides downlink or uplink transmission services to several UEs. In this case, different cells can be configured to provide different bandwidths.

Hereinafter, a downlink (DL) denotes communication from the eNB 20 to the UE 10, and an uplink (UL) denotes communication from the UE 10 to the eNB 20. In the DL, a transmitter may be a part of the eNB 20, and a receiver may be a part of the UE 10. In the UL, the transmitter may be a part of the UE 10, and the receiver may be a part of the eNB 20.

The EPC includes a mobility management entity (MME) which is in charge of control plane functions, and a system architecture evolution (SAE) gateway (S-GW) which is in charge of user plane functions. The MME/S-GW 30 may be positioned at the end of the network and connected to an external network. The MME has UE access information or UE capability information, and such information may be primarily used in UE mobility management. The S-GW is a gateway of which an endpoint is an E-UTRAN. The MME/S-GW 30 provides an end point of a session and mobility management function for the UE 10. The EPC may further include a packet data network (PDN) gateway (PDN-GW). The PDN-GW is a gateway of which an endpoint is a PDN.

The MME provides various functions including non-access stratum (NAS) signaling to eNBs 20, NAS signaling security, access stratum (AS) security control, Inter core network (CN) node signaling for mobility between 3GPP access networks, idle mode UE reachability (including control and execution of paging retransmission), tracking area list management (for UE in idle and active mode), P-GW and S-GW selection, MME selection for handovers with MME change, serving GPRS support node (SGSN) selection for handovers to 2G or 3G 3GPP access networks, roaming, authentication, bearer management functions including dedicated bearer establishment, support for public warning system (PWS) (which includes earthquake and tsunami warning system (ETWS) and commercial mobile alert system (CMAS)) message transmission. The S-GW host provides assorted functions including per-user based packet filtering (by e.g., deep packet inspection), lawful interception, UE Internet protocol (IP) address allocation, transport level packet marking in the DL, UL and DL service level charging, gating and rate enforcement, DL rate enforcement based on APN-AMBR. For clarity MME/S-GW 30 will be referred to herein simply as a "gateway," but it is understood that this entity includes both the MME and S-GW.

Interfaces for transmitting user traffic or control traffic may be used. The UE 10 and the eNB 20 are connected by means of a Uu interface. The eNBs 20 are interconnected by means of an X2 interface. Neighboring eNBs may have a meshed network structure that has the X2 interface. The eNBs 20 are connected to the EPC by means of an S1 interface. The eNBs 20 are connected to the MME by means of an S1-MME interface, and are connected to the S-GW by means of S1-U interface. The S1 interface supports a many-to-many relation between the eNB 20 and the MME/S-GW.

FIG. 2 shows a block diagram of architecture of a typical E-UTRAN and a typical EPC. Referring to FIG. 2, the eNB 20 may perform functions of selection for gateway 30, routing toward the gateway 30 during a radio resource control (RRC) activation, scheduling and transmitting of paging messages, scheduling and transmitting of broadcast channel (BCH) information, dynamic allocation of resources to the UEs 10 in both UL and DL, configuration and provisioning of eNB measurements, radio bearer control, radio admission control (RAC), and connection mobility control in LTE_ACTIVE state. In the EPC, and as noted above, gateway 30 may perform functions of paging origination, LTE_IDLE state management, ciphering of the user plane, SAE bearer control, and ciphering and integrity protection of NAS signaling.

FIG. 3 shows a block diagram of a user plane protocol stack and a control plane protocol stack of an LTE system. FIG. 3-(a) shows a block diagram of a user plane protocol stack of an LTE system, and FIG. 3-(b) shows a block diagram of a control plane protocol stack of an LTE system.

Layers of a radio interface protocol between the UE and the E-UTRAN may be classified into a first layer (L1), a second layer (L2), and a third layer (L3) based on the lower three layers of the open system interconnection (OSI) model that is well-known in the communication system. The radio interface protocol between the UE and the E-UTRAN may be horizontally divided into a physical layer, a data link layer, and a network layer, and may be vertically divided into a control plane (C-plane) which is a protocol stack for control signal transmission and a user plane (U-plane) which is a protocol stack for data information transmission. The layers of the radio interface protocol exist in pairs at the UE and the E-UTRAN, and are in charge of data transmission of the Uu interface.

A physical (PHY) layer belongs to the L1. The PHY layer provides a higher layer with an information transfer service through a physical channel. The PHY layer is connected to a medium access control (MAC) layer, which is a higher layer of the PHY layer, through a transport channel. A physical channel is mapped to the transport channel. Data is transferred between the MAC layer and the PHY layer through the transport channel. Between different PHY layers, i.e., a PHY layer of a transmitter and a PHY layer of a receiver, data is transferred through the physical channel using radio resources. The physical channel is modulated using an orthogonal frequency division multiplexing (OFDM) scheme, and utilizes time and frequency as a radio resource.

The PHY layer uses several physical control channels. A physical downlink control channel (PDCCH) reports to a UE about resource allocation of a paging channel (PCH) and a downlink shared channel (DL-SCH), and hybrid automatic repeat request (HARQ) information related to the DL-SCH. The PDCCH may carry a UL grant for reporting to the UE about resource allocation of UL transmission. A physical control format indicator channel (PCFICH) reports the number of OFDM symbols used for PDCCHs to the UE, and is transmitted in every subframe. A physical hybrid ARQ indicator channel (PHICH) carries an HARQ acknowledgement (ACK)/non-acknowledgement (NACK) signal in response to UL transmission. A physical uplink control channel (PUCCH) carries UL control information such as HARQ ACK/NACK for DL transmission, scheduling request, and CQI. A physical uplink shared channel (PUSCH) carries a UL-uplink shared channel (SCH).

FIG. 4 shows an example of a physical channel structure.

A physical channel consists of a plurality of subframes in time domain and a plurality of subcarriers in frequency domain. One subframe consists of a plurality of symbols in the time domain. One subframe consists of a plurality of resource blocks (RBs). One RB consists of a plurality of symbols and a plurality of subcarriers. In addition, each subframe may use specific subcarriers of specific symbols of a corresponding subframe for a PDCCH. For example, a first symbol of the subframe may be used for the PDCCH. The PDCCH carries dynamic allocated resources, such as a physical resource block (PRB) and modulation and coding scheme (MCS). A transmission time interval (TTI) which is a unit time for data transmission may be equal to a length of one subframe. The length of one subframe may be 1 ms.

The transport channel is classified into a common transport channel and a dedicated transport channel according to whether the channel is shared or not. A DL transport channel for transmitting data from the network to the UE includes a broadcast channel (BCH) for transmitting system information, a paging channel (PCH) for transmitting a paging message, a DL-SCH for transmitting user traffic or control signals, etc. The DL-SCH supports HARQ, dynamic link adaptation by varying the modulation, coding and transmit power, and both dynamic and semi-static resource allocation. The DL-SCH also may enable broadcast in the entire cell and the use of beamforming. The system information carries one or more system information blocks. All system information blocks may be transmitted with the same periodicity. Traffic or control signals of a multimedia broadcast/multicast service (MBMS) may be transmitted through the DL-SCH or a multicast channel (MCH).

A UL transport channel for transmitting data from the UE to the network includes a random access channel (RACH) for transmitting an initial control message, a UL-SCH for transmitting user traffic or control signals, etc. The UL-SCH supports HARQ and dynamic link adaptation by varying the transmit power and potentially modulation and coding. The UL-SCH also may enable the use of beamforming. The RACH is normally used for initial access to a cell.

A MAC layer belongs to the L2. The MAC layer provides services to a radio link control (RLC) layer, which is a higher layer of the MAC layer, via a logical channel. The MAC layer provides a function of mapping multiple logical channels to multiple transport channels. The MAC layer also provides a function of logical channel multiplexing by mapping multiple logical channels to a single transport channel. A MAC sublayer provides data transfer services on logical channels.

The logical channels are classified into control channels for transferring control plane information and traffic channels for transferring user plane information, according to a type of transmitted information. That is, a set of logical channel types is defined for different data transfer services offered by the MAC layer. The logical channels are located above the transport channel, and are mapped to the transport channels.

The control channels are used for transfer of control plane information only. The control channels provided by the MAC layer include a broadcast control channel (BCCH), a paging control channel (PCCH), a common control channel (CCCH), a multicast control channel (MCCH) and a dedicated control channel (DCCH). The BCCH is a downlink channel for broadcasting system control information. The PCCH is a downlink channel that transfers paging information and is used when the network does not know the location cell of a UE. The CCCH is used by UEs having no RRC connection with the network. The MCCH is a point-to-multipoint downlink channel used for transmitting MBMS control information from the network to a UE. The DCCH is a point-to-point bi-directional channel used by UEs having an RRC connection that transmits dedicated control information between a UE and the network.

Traffic channels are used for the transfer of user plane information only. The traffic channels provided by the MAC layer include a dedicated traffic channel (DTCH) and a multicast traffic channel (MTCH). The DTCH is a point-to-point channel, dedicated to one UE for the transfer of user information and can exist in both uplink and downlink. The MTCH is a point-to-multipoint downlink channel for transmitting traffic data from the network to the UE.

Uplink connections between logical channels and transport channels include the DCCH that can be mapped to the UL-SCH, the DTCH that can be mapped to the UL-SCH and the CCCH that can be mapped to the UL-SCH. Downlink connections between logical channels and transport channels include the BCCH that can be mapped to the BCH or DL-SCH, the PCCH that can be mapped to the PCH, the DCCH that can be mapped to the DL-SCH, and the DTCH that can be mapped to the DL-SCH, the MCCH that can be mapped to the MCH, and the MTCH that can be mapped to the MCH.

An RLC layer belongs to the L2. The RLC layer provides a function of adjusting a size of data, so as to be suitable for a lower layer to transmit the data, by concatenating and segmenting the data received from a higher layer in a radio section. In addition, to ensure a variety of quality of service (QoS) required by a radio bearer (RB), the RLC layer provides three operation modes, i.e., a transparent mode (TM), an unacknowledged mode (UM), and an acknowledged mode (AM). The AM RLC provides a retransmission function through an automatic repeat request (ARQ) for reliable data transmission. Meanwhile, a function of the RLC layer may be implemented with a functional block inside the MAC layer. In this case, the RLC layer may not exist.

A packet data convergence protocol (PDCP) layer belongs to the L2. The PDCP layer provides a function of header compression function that reduces unnecessary control information such that data being transmitted by employing IP packets, such as IPv4 or IPv6, can be efficiently transmitted over a radio interface that has a relatively small bandwidth. The header compression increases transmission efficiency in the radio section by transmitting only necessary information in a header of the data. In addition, the PDCP layer provides a function of security. The function of security includes ciphering which prevents inspection of third parties, and integrity protection which prevents data manipulation of third parties.

A radio resource control (RRC) layer belongs to the L3. The RLC layer is located at the lowest portion of the L3, and is only defined in the control plane. The RRC layer takes a role of controlling a radio resource between the UE and the network. For this, the UE and the network exchange an RRC message through the RRC layer. The RRC layer controls logical channels, transport channels, and physical channels in relation to the configuration, reconfiguration, and release of RBs. An RB is a logical path provided by the L1 and L2 for data delivery between the UE and the network. That is, the RB signifies a service provided the L2 for data transmission between the UE and E-UTRAN. The configuration of the RB implies a process for specifying a radio protocol layer and channel properties to provide a particular service and for determining respective detailed parameters and operations. The RB is classified into two types, i.e., a signaling RB (SRB) and a data RB (DRB). The SRB is used as a path for transmitting an RRC message in the control plane. The DRB is used as a path for transmitting user data in the user plane.

Referring to FIG. 3-(a), the RLC and MAC layers (terminated in the eNB on the network side) may perform functions such as scheduling, automatic repeat request (ARQ), and hybrid automatic repeat request (HARQ). The PDCP layer (terminated in the eNB on the network side) may perform the user plane functions such as header compression, integrity protection, and ciphering.

Referring to FIG. 3-(b), the RLC and MAC layers (terminated in the eNB on the network side) may perform the same functions for the control plane. The RRC layer (terminated in the eNB on the network side) may perform functions such as broadcasting, paging, RRC connection management, RB control, mobility functions, and UE measurement reporting and controlling. The NAS control protocol (terminated in the MME of gateway on the network side) may perform functions such as a SAE bearer management, authentication, LTE_IDLE mobility handling, paging origination in LTE_IDLE, and security control for the signaling between the gateway and UE.

An RRC state indicates whether an RRC layer of the UE is logically connected to an RRC layer of the E-UTRAN. The RRC state may be divided into two different states such as an RRC connected state and an RRC idle state. When an RRC connection is established between the RRC layer of the UE and the RRC layer of the E-UTRAN, the UE is in RRC_CONNECTED, and otherwise the UE is in RRC_IDLE. Since the UE in RRC_CONNECTED has the RRC connection established with the E-UTRAN, the E-UTRAN may recognize the existence of the UE in RRC_CONNECTED and may effectively control the UE. Meanwhile, the UE in RRC_IDLE may not be recognized by the E-UTRAN, and a CN manages the UE in unit of a TA which is a larger area than a cell. That is, only the existence of the UE in RRC_IDLE is recognized in unit of a large area, and the UE must transition to RRC_CONNECTED to receive a typical mobile communication service such as voice or data communication.

In RRC_IDLE state, the UE may receive broadcasts of system information and paging information while the UE specifies a discontinuous reception (DRX) configured by NAS, and the UE has been allocated an identification (ID) which uniquely identifies the UE in a tracking area and may perform public land mobile network (PLMN) selection and cell re-selection. Also, in RRC_IDLE state, no RRC context is stored in the eNB.

In RRC_CONNECTED state, the UE has an E-UTRAN RRC connection and a context in the E-UTRAN, such that transmitting and/or receiving data to/from the eNB becomes possible. Also, the UE can report channel quality information and feedback information to the eNB. In RRC_CONNECTED state, the E-UTRAN knows the cell to which the UE belongs. Therefore, the network can transmit and/or receive data to/from UE, the network can control mobility (handover and inter-radio access technologies (RAT) cell change order to GSM EDGE radio access network (GERAN) with network assisted cell change (NACC)) of the UE, and the network can perform cell measurements for a neighboring cell.

In RRC_IDLE state, the UE specifies the paging DRX cycle. Specifically, the UE monitors a paging signal at a specific paging occasion of every UE specific paging DRX cycle. The paging occasion is a time interval during which a paging signal is transmitted. The UE has its own paging occasion.

A paging message is transmitted over all cells belonging to the same tracking area. If the UE moves from one TA to another TA, the UE will send a tracking area update (TAU) message to the network to update its location.

When the user initially powers on the UE, the UE first searches for a proper cell and then remains in RRC_IDLE in the cell. When there is a need to establish an RRC connection, the UE which remains in RRC_IDLE establishes the RRC connection with the RRC of the E-UTRAN through an RRC connection procedure and then may transition to RRC_CONNECTED. The UE which remains in RRC_IDLE may need to establish the RRC connection with the E-UTRAN when uplink data transmission is necessary due to a user's call attempt or the like or when there is a need to transmit a response message upon receiving a paging message from the E-UTRAN.

It is known that different cause values may be mapped o the signature sequence used to transmit messages between a UE and eNB and that either channel quality indicator (CQI) or path loss and cause or message size are candidates for inclusion in the initial preamble.

When a UE wishes to access the network and determines a message to be transmitted, the message may be linked to a purpose and a cause value may be determined. The size of the ideal message may be also be determined by identifying all optional information and different alternative sizes, such as by removing optional information, or an alternative scheduling request message may be used.

The UE acquires necessary information for the transmission of the preamble, UL interference, pilot transmit power and required signal-to-noise ratio (SNR) for the preamble detection at the receiver or combinations thereof. This information must allow the calculation of the initial transmit power of the preamble. It is beneficial to transmit the UL message in the vicinity of the preamble from a frequency point of view in order to ensure that the same channel is used for the transmission of the message.

The UE should take into account the UL interference and the UL path loss in order to ensure that the network receives the preamble with a minimum SNR. The UL interference can be determined only in the eNB, and therefore, must be broadcast by the eNB and received by the UE prior to the transmission of the preamble. The UL path loss can be considered to be similar to the DL path loss and can be estimated by the UE from the received RX signal strength when the transmit power of some pilot sequence of the cell is known to the UE.

The required UL SNR for the detection of the preamble would typically depend on the eNB configuration, such as a number of Rx antennas and receiver performance. There may be advantages to transmit the rather static transmit power of the pilot and the necessary UL SNR separately from the varying UL interference and possibly the power offset required between the preamble and the message.

The initial transmission power of the preamble can be roughly calculated according to the following formula:

Transmit power=TransmitPilot−$Rx$Pilot+ULInterference+Offset+SNRRequired

Therefore, any combination of SNRRequired, ULInterference, TransmitPilot and Offset can be broadcast. In principle, only one value must be broadcast. This is essentially in current UMTS systems, although the UL interference in 3GPP LTE will mainly be neighboring cell interference that is probably more constant than in UMTS system.

The UE determines the initial UL transit power for the transmission of the preamble as explained above. The receiver in the eNB is able to estimate the absolute received power as well as the relative received power compared to the interference in the cell. The eNB will consider a preamble detected if the received signal power compared to the interference is above an eNB known threshold.

The UE performs power ramping in order to ensure that a UE can be detected even if the initially estimated transmission power of the preamble is not adequate. Another preamble will most likely be transmitted if no ACK or NACK is received by the UE before the next random access attempt. The transmit power of the preamble can be increased, and/or the preamble can be transmitted on a different UL frequency in order to increase the probability of detection. Therefore, the actual transmit power of the preamble that will be detected does not necessarily correspond to the initial transmit power of the preamble as initially calculated by the UE.

The UE must determine the possible UL transport format. The transport format, which may include MCS and a number of resource blocks that should be used by the UE, depends mainly on two parameters, specifically the SNR at the eNB and the required size of the message to be transmitted.

In practice, a maximum UE message size, or payload, and a required minimum SNR correspond to each transport format. In UMTS, the UE determines before the transmission of the preamble whether a transport format can be chosen for the transmission according to the estimated initial preamble transmit power, the required offset between preamble and the transport block, the maximum allowed or available UE transmit power, a fixed offset and additional margin. The preamble in UMTS need not contain any information regarding the transport format selected by the EU since the network does not need to reserve time and frequency resources and, therefore, the transport format is indicated together with the transmitted message.

The eNB must be aware of the size of the message that the UE intends to transmit and the SNR achievable by the UE in order to select the correct transport format upon reception of the preamble and then reserve the necessary time and frequency resources. Therefore, the eNB cannot estimate the SNR achievable by the EU according to the received preamble because the UE transmit power compared to the maximum allowed or possible UE transmit power is not known to the eNB, given that the UE will most likely consider the measured path loss in the DL or some equivalent measure for the determination of the initial preamble transmission power.

The eNB could calculate a difference between the path loss estimated in the DL compared and the path loss of the UL. However, this calculation is not possible if power ramping is used and the UE transmit power for the preamble does not correspond to the initially calculated UE transmit power. Furthermore, the precision of the actual UE transmit power and the transmit power at which the UE is intended to transmit is very low. Therefore, it has been proposed to code the path loss or CQI estimation of the downlink and the message size or the cause value in the UL in the signature.

Small cells using low power nodes are considered promising to cope with mobile traffic explosion, especially for hotspot deployments in indoor and outdoor scenarios. A low-power node generally means a node whose transmission (Tx) power is lower than macro node and base station (BS) classes, for example a pico and femto eNodeB (eNB) are both applicable. Small cell enhancements for the 3GPP LTE will focus on additional functionalities for enhanced performance in hotspot areas for indoor and outdoor using low power nodes.

An efficient data forwarding method for small cell enhancement may be required.

SUMMARY OF THE INVENTION

The present invention provides a method and apparatus for forwarding data for a small cell in a wireless communication system. The present invention also provides a method for transmitting an indication which makes a small cell stop small cell services and start forwarding data. The present invention also provides a method for transmitting a user equipment (UE) X2 context release message.

In an aspect, a method for forwarding, by a small cell, data in a wireless communication system is provided. The method includes receiving an indication which indicates stopping serving a small cell service from a macro eNodeB (eNB), and upon receiving the indication, starting to forward data to the macro eNB.

The indication may be received via a service deactivation message or a secondary eNB (SeNB) release message.

The indication may be received via an information element (IE) in a service deactivation message or in an SeNB release message. The IE may be a downlink general packet radio services (GPRS) tunneling protocol (GTP) tunnel endpoint or an uplink GTP tunnel endpoint, which is generated by the macro eNB.

The indication may be received via an X2 end marker.

The method may further include transmitting a sequence number (SN) status transfer message with the data to the macro eNB.

The method may further include receiving an X2 end marker, generated by the macro eNB, from the macro eNB.

The method may further include receiving a UE X2 context release message from the macro eNB.

In another aspect, a method for transmitting, by a macro eNodeB (eNB), an indication in a wireless communication system is provided. The method includes upon receiving a handover request acknowledge message, transmitting an indication which indicates stopping serving a small cell service to a small cell, and receiving forwarded data, with a sequence number (SN) status transfer message, from the small cell.

For small cell enhancement, data forwarding can be performed effectively.

BRIEF DESCRIPTION OF THE DRAWINGS

FIG. 3 shows a block diagram of a user plane protocol stack and a control plane protocol stack of an LTE system.

DESCRIPTION OF EXEMPLARY EMBODIMENTS

Figure 1:
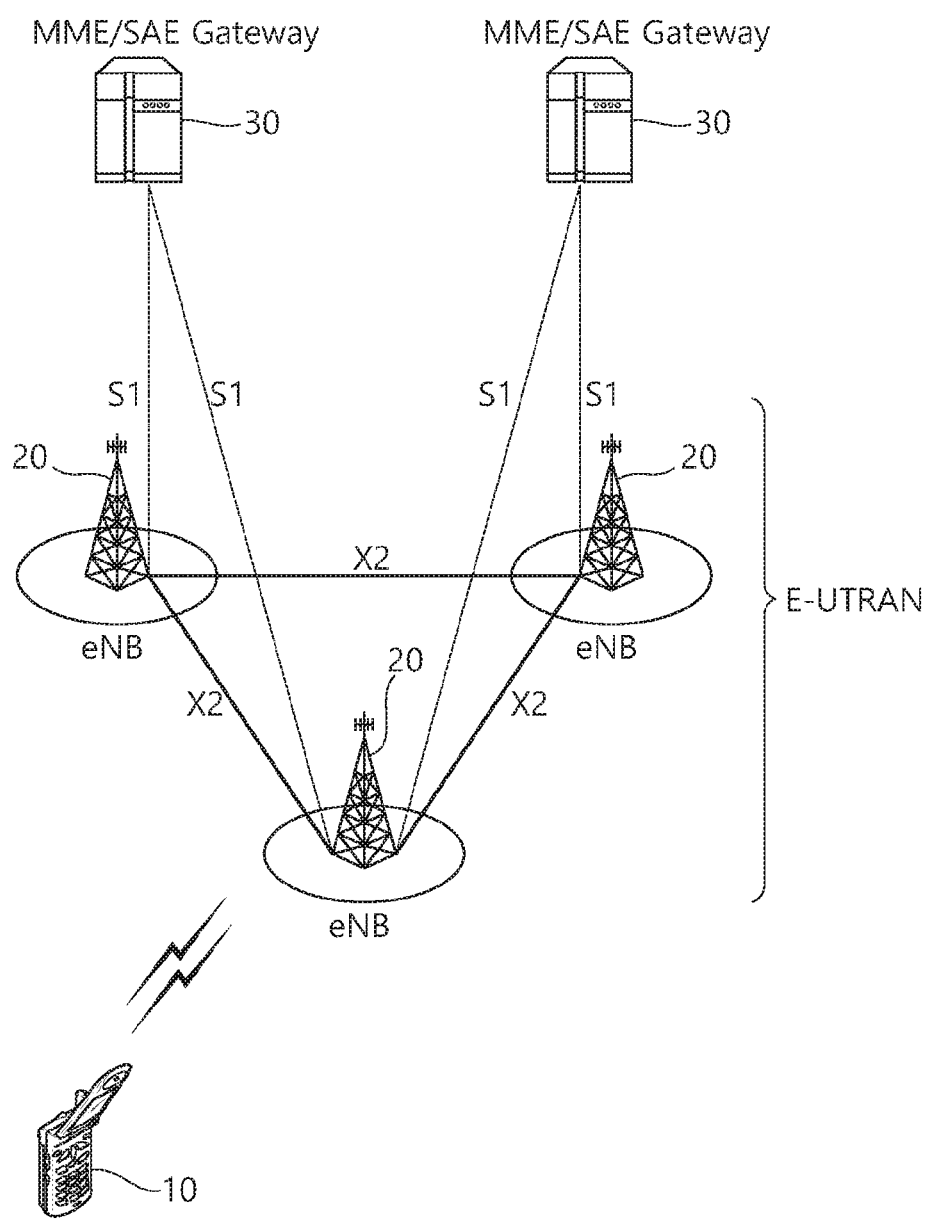
FIG. 1 shows LTE system architecture.
Figure 2:
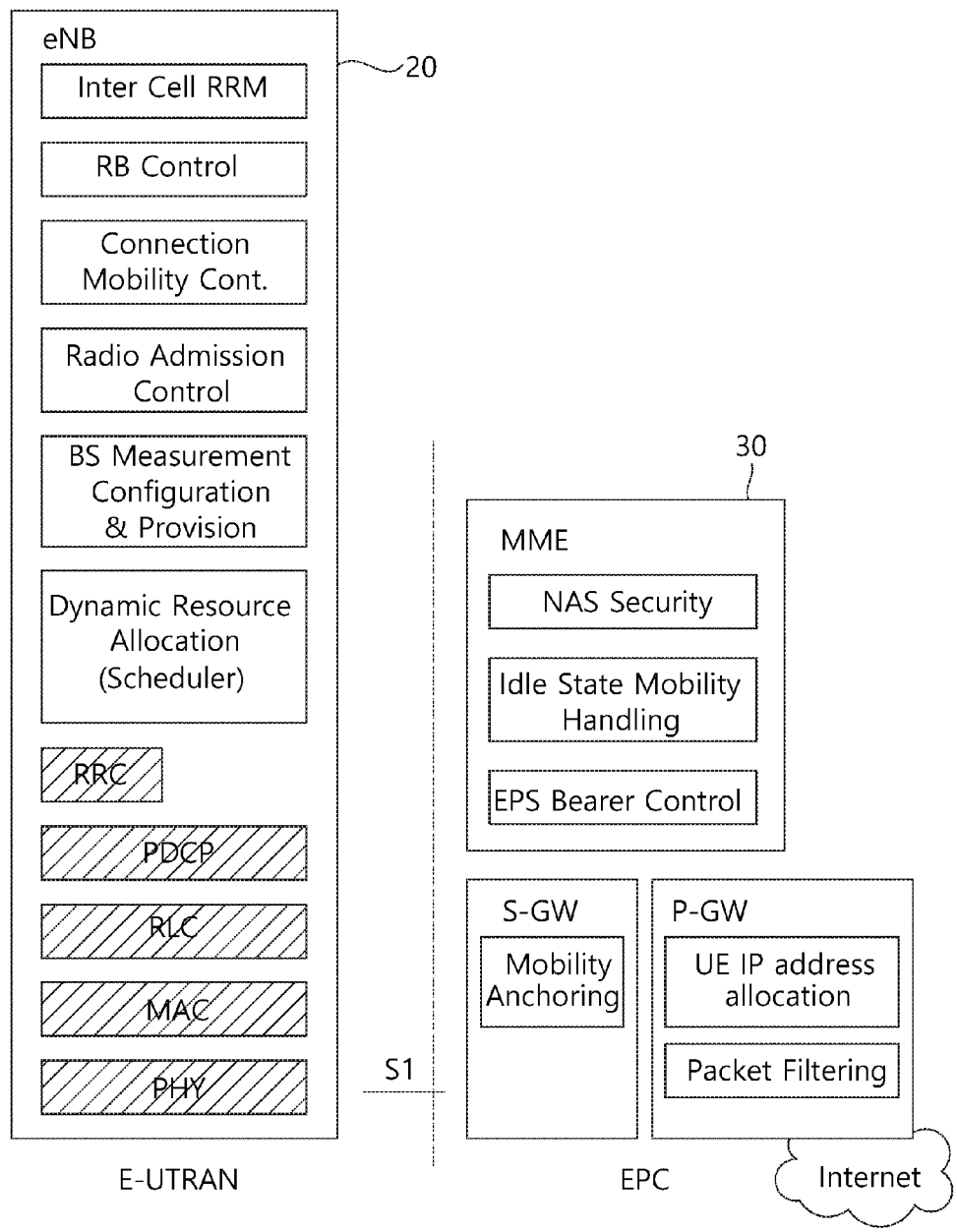
FIG. 2 shows a block diagram of architecture of a typical E-UTRAN and a typical EPC.
Figure 4:
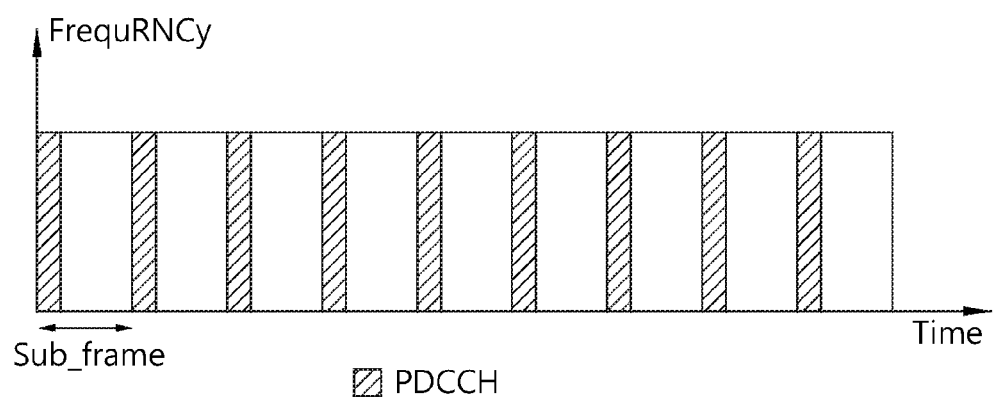
FIG. 4 shows an example of a physical channel structure.

The technology described below can be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), etc. The CDMA can be implemented with a radio technology such as universal terrestrial radio access (UTRA) or CDMA-2000. The TDMA can be implemented with a radio technology such as global system for mobile communications (GSM)/general packet ratio service (GPRS)/enhanced data rate for GSM evolution (EDGE). The OFDMA can be implemented with a radio technology such as institute of electrical and electronics engineers (IEEE) 802.11 (Wi-Fi), IEEE 802.16 (WiMAX), IEEE 802-20, evolved UTRA (E-UTRA), etc. IEEE 802.16m is an evolution of IEEE 802.16e, and provides backward compatibility with an IEEE 802.16-based system. The UTRA is a part of a universal mobile telecommunication system (UMTS). 3rd generation partnership project (3GPP) long term evolution (LTE) is a part of an evolved UMTS (E-UMTS) using the E-UTRA. The 3GPP LTE uses the OFDMA in downlink and uses the SC-FDMA in uplink. LTE-advance (LTE-A) is an evolution of the 3GPP LTE.

For clarity, the following description will focus on the LTE-A. However, technical features of the present invention are not limited thereto.

Handover (HO) is described. It may be referred to Section 10.1.2.1 of 3GPP TS 36.300 V11.4.0 (2012-12).

The intra E-UTRAN HO of a UE in RRC_CONNECTED state is a UE-assisted network-controlled HO, with HO preparation signaling in E-UTRAN:

Part of the HO command comes from the target eNB and is transparently forwarded to the UE by the source eNB;

To prepare the HO, the source eNB passes all necessary information to the target eNB (e.g., E-UTRAN radio access bearer (E-RAB) attributes and RRC context): When carrier aggregation (CA) is configured and to enable secondary cell (SCell) selection in the target eNB, the source eNB can provide in decreasing order of radio quality a list of the best cells and optionally measurement result of the cells.

Both the source eNB and UE keep some context (e.g., C-RNTI) to enable the return of the UE in case of HO failure;

UE accesses the target cell via RACH following a contention-free procedure using a dedicated RACH preamble or following a contention-based procedure if dedicated RACH preambles are not available: the UE uses the dedicated preamble until the handover procedure is finished (successfully or unsuccessfully);

If the RACH procedure towards the target cell is not successful within a certain time, the UE initiates radio link failure recovery using the best cell;

No robust header compression (ROHC) context is transferred at handover.

The preparation and execution phase of the HO procedure is performed without EPC involvement, i.e., preparation messages are directly exchanged between the eNBs. The release of the resources at the source side during the HO completion phase is triggered by the eNB. In case an RN is involved, its donor eNB (DeNB) relays the appropriate S1 messages between the RN and the MME (S1-based handover) and X2 messages between the RN and target eNB (X2-based handover); the DeNB is explicitly aware of a UE attached to the RN due to the S1 proxy and X2 proxy functionality.

Figure 5:
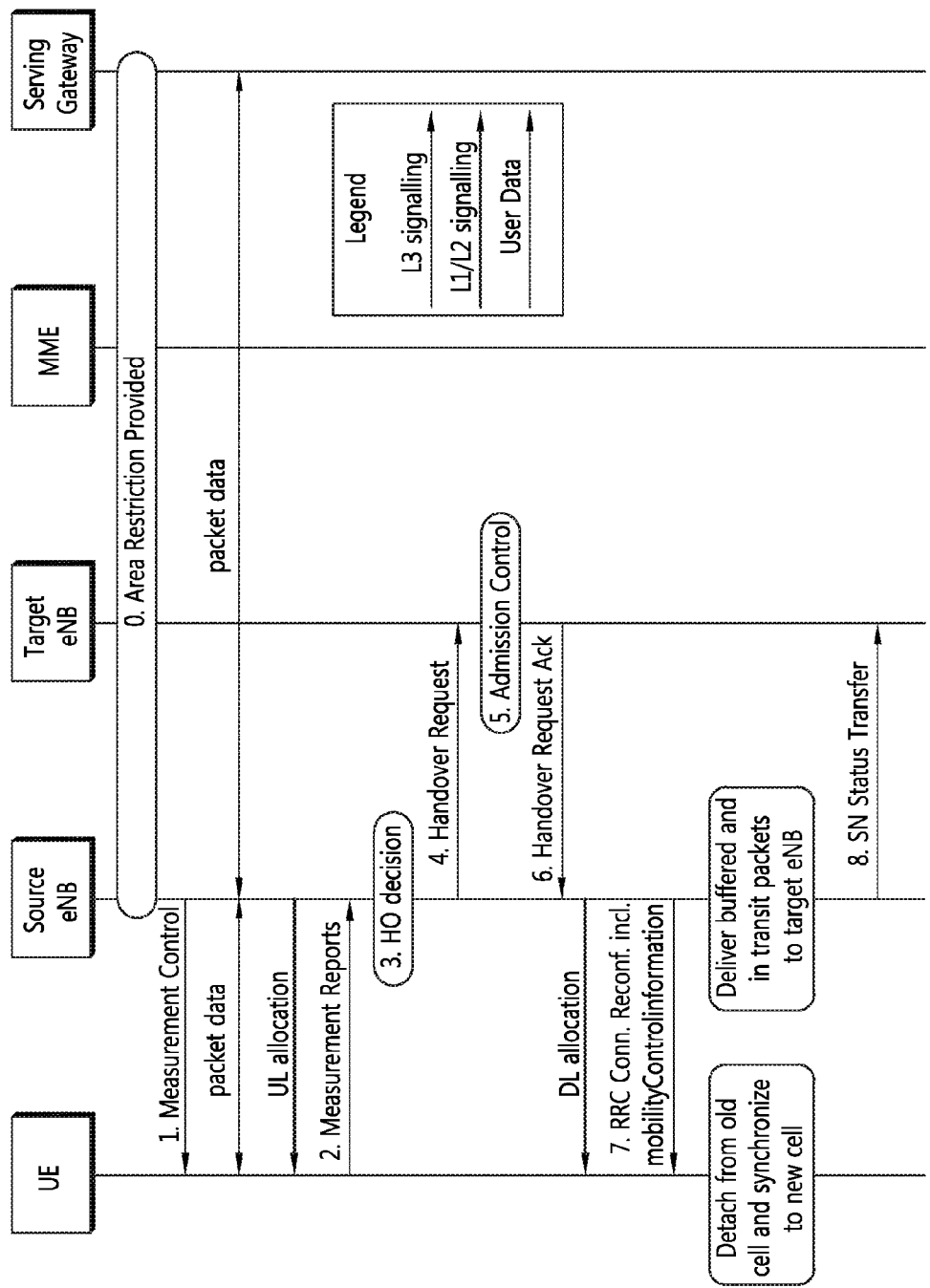
FIGS. 5 and 6 show an intra-MME/S-GW handover procedure.
Figure 6:
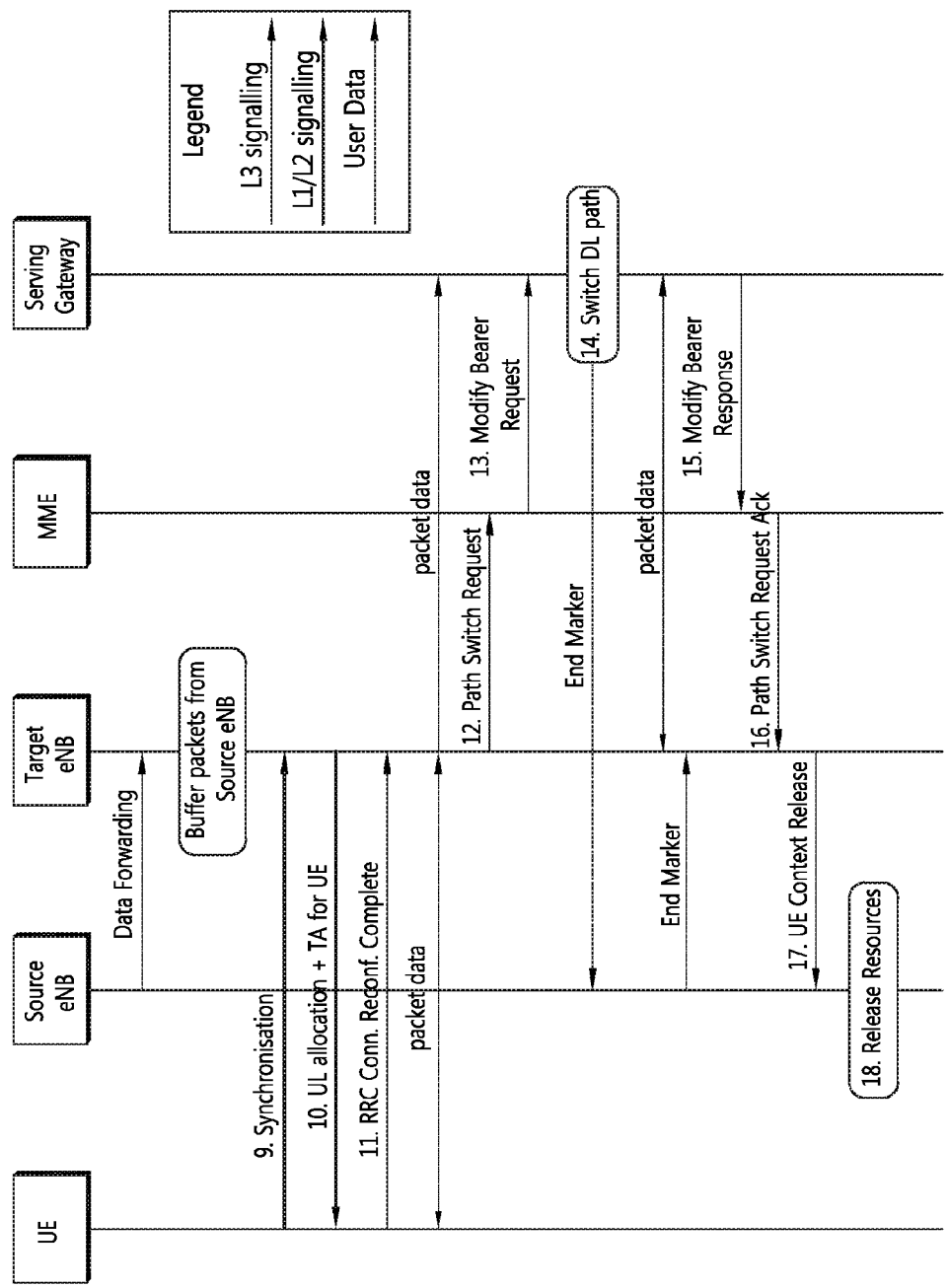

FIGS. 5 and 6 show an intra-MME/S-GW handover procedure.

0. The UE context within the source eNB contains information regarding roaming restrictions which were provided either at connection establishment or at the last TA update.

1. The source eNB configures the UE measurement procedures according to the area restriction information. Measurements provided by the source eNB may assist the function controlling the UE's connection mobility.

2. The UE is triggered to send measurement reports by the rules set by i.e., system information, specification, etc.

3. The source eNB makes decision based on measurement reports and radio resource management (RRM) information to hand off the UE.

4. The source eNB issues a handover request message to the target eNB passing necessary information to prepare the HO at the target side (UE X2 signalling context reference at source eNB, UE S1 EPC signalling context reference, target cell identifier (ID), $K_{eNB}^*$, RRC context including the cell radio network temporary identifier (C-RNTI) of the UE in the source eNB, AS-configuration, E-RAB context and physical layer ID of the source cell+short MAC-I for possible radio link failure (RLF) recovery). UE X2/UE S1 signalling references enable the target eNB to address the source eNB and the EPC. The E-RAB context includes necessary radio network layer (RNL) and transport network layer (TNL) addressing information, and quality of service (QoS) profiles of the E-RABs.

5. Admission Control may be performed by the target eNB dependent on the received E-RAB QoS information to increase the likelihood of a successful HO, if the resources can be granted by target eNB. The target eNB configures the required resources according to the received E-RAB QoS information and reserves a C-RNTI and optionally a RACH preamble. The AS-configuration to be used in the target cell can either be specified independently (i.e., an "establishment") or as a delta compared to the AS-configuration used in the source cell (i.e., a "reconfiguration").

6. The target eNB prepares HO with L1/L2 and sends the handover request acknowledge to the source eNB. The handover request acknowledge message includes a transparent container to be sent to the UE as an RRC message to perform the handover. The container includes a new C-RNTI, target eNB security algorithm identifiers for the selected security algorithms, may include a dedicated RACH preamble, and possibly some other parameters, i.e., access parameters, SIBs, etc. The handover request acknowledge message may also include RNL/TNL information for the forwarding tunnels, if necessary.

As soon as the source eNB receives the handover request acknowledge, or as soon as the transmission of the handover command is initiated in the downlink, data forwarding may be initiated.

Steps 7 to 16 in FIGS. 5 and 6 provide means to avoid data loss during HO.

7. The target eNB generates the RRC message to perform the handover, i.e., RRCConnectionReconfiguration message including the mobilityControlInformation, to be sent by the source eNB towards the UE. The source eNB performs the necessary integrity protection and ciphering of the message. The UE receives the RRCConnectionReconfiguration message with necessary parameters (i.e. new C-RNTI, target eNB security algorithm identifiers, and optionally dedicated RACH preamble, target eNB SIBs, etc.) and is commanded by the source eNB to perform the HO. The UE does not need to delay the handover execution for delivering the HARQ/ARQ responses to source eNB.

8. The source eNB sends the sequence number (SN) status transfer message to the target eNB to convey the uplink PDCP SN receiver status and the downlink PDCP SN transmitter status of E-RABs for which PDCP status preservation applies (i.e., for RLC AM). The uplink PDCP SN receiver status includes at least the PDCP SN of the first missing UL service data unit (SDU) and may include a bit map of the receive status of the out of sequence UL SDUs that the UE needs to retransmit in the target cell, if there are any such SDUs. The downlink PDCP SN transmitter status indicates the next PDCP SN that the target eNB shall assign to new SDUs, not having a PDCP SN yet. The source eNB may omit sending this message if none of the E-RABs of the UE shall be treated with PDCP status preservation.

9. After receiving the RRCConnectionReconfiguration message including the mobilityControlInformation, UE performs synchronization to target eNB and accesses the target cell via RACH, following a contention-free procedure if a dedicated RACH preamble was indicated in the mobilityControlInformation, or following a contention-based procedure if no dedicated preamble was indicated. UE derives target eNB specific keys and configures the selected security algorithms to be used in the target cell.

10. The target eNB responds with UL allocation and timing advance.

11. When the UE has successfully accessed the target cell, the UE sends the RRCConnectionReconfigurationComplete message (C-RNTI) to confirm the handover, along with an uplink buffer status report, whenever possible, to the target eNB to indicate that the handover procedure is completed for the UE. The target eNB verifies the C-RNTI sent in the RRCConnectionReconfigurationComplete message. The target eNB can now begin sending data to the UE.

12. The target eNB sends a path switch request message to MME to inform that the UE has changed cell.

13. The MME sends a modify bearer request message to the serving gateway.

14. The serving gateway switches the downlink data path to the target side. The Serving gateway sends one or more "end marker" packets on the old path to the source eNB and then can release any U-plane/TNL resources towards the source eNB.

15. The serving gateway sends a modify bearer response message to MME.

16. The MME confirms the path switch request message with the path switch request acknowledge message.

17. By sending the UE context release message, the target eNB informs success of HO to source eNB and triggers the release of resources by the source eNB. The target eNB sends this message after the path switch request acknowledge message is received from the MME.

18. Upon reception of the UE context release message, the source eNB can release radio and C-plane related resources associated to the UE context. Any ongoing data forwarding may continue.

Small cell enhancement is described. It may be referred to 3GPP TR 36.932 V12.0.0 (2012-12).

Figure 7:
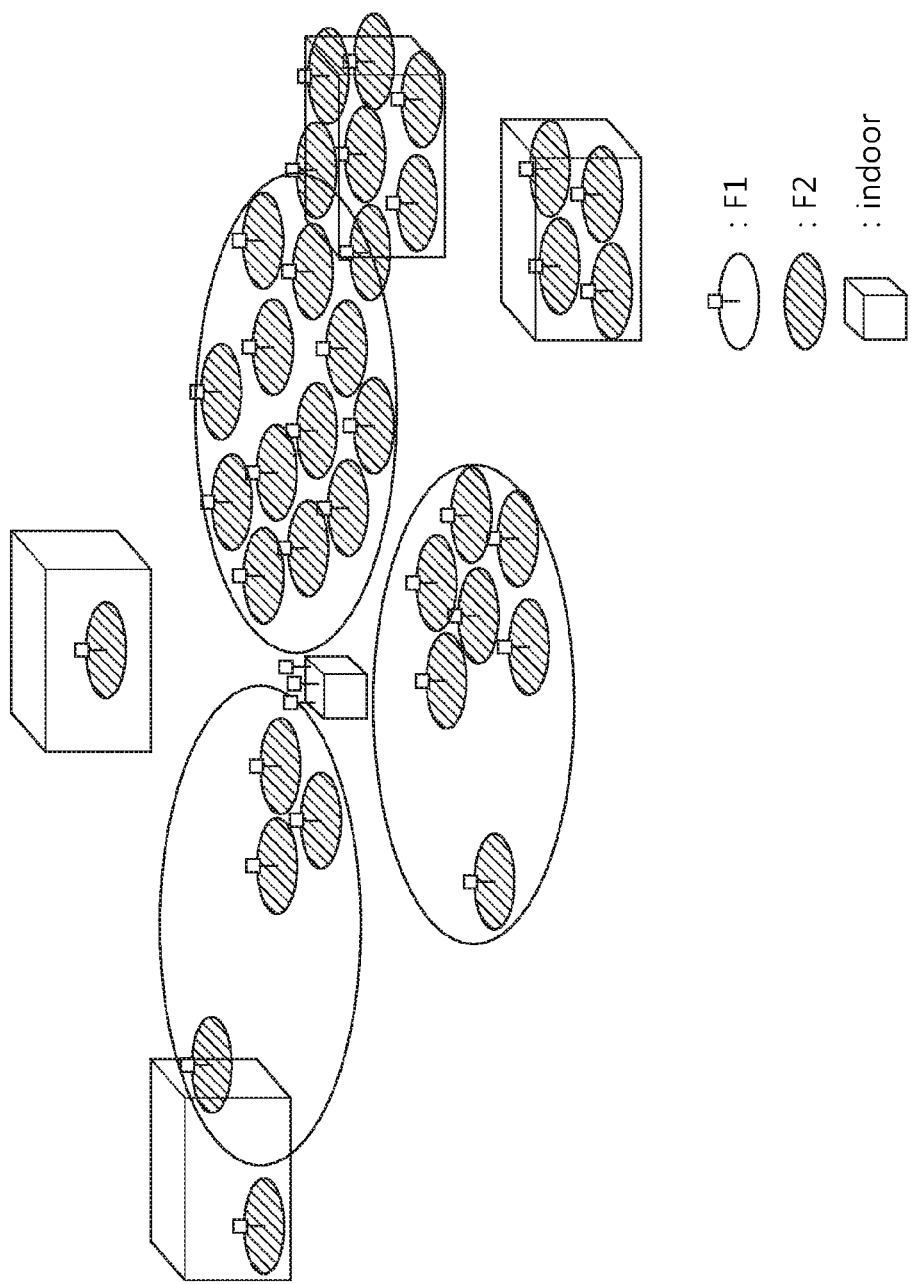
FIG. 7 shows deployment scenarios of small cells with/without macro coverage.

FIG. 7 shows deployment scenarios of small cells with/without macro coverage. Small cell enhancement should target both with and without macro coverage, both outdoor and indoor small cell deployments and both ideal and non-ideal backhaul. Both sparse and dense small cell deployments should be considered.

Referring to FIG. 7, small cell enhancement should target the deployment scenario in which small cell nodes are deployed under the coverage of one or more than one overlaid E-UTRAN macro-cell layer(s) in order to boost the capacity of already deployed cellular network. Two scenarios can be considered:

where the UE is in coverage of both the macro cell and the small cell simultaneously where the UE is not in coverage of both the macro cell and the small cell simultaneously.

Also, the deployment scenario where small cell nodes are not deployed under the coverage of one or more overlaid E-UTRAN macro-cell layer(s) may be considered.

Small cell enhancement should target both outdoor and indoor small cell deployments. The small cell nodes could be deployed indoors or outdoors, and in either case could provide service to indoor or outdoor UEs.

For indoor UE, only low UE speed (0-3 km/h) is targeted. For outdoor, not only low UE speed, but also medium UE speed (up to 30 km/h and potentially higher speeds) is targeted.

Both throughput and mobility/connectivity shall be used as performance metric for both low and medium mobility. Cell edge performance (e.g., 5%-tile cumulative distribution function (CDF) point for user throughput) and power efficiency (of both network and UE) are also used as metrics.

Both ideal backhaul (i.e., very high throughput and very low latency backhaul such as dedicated point-to-point connection using optical fiber, line-of-sight (LOS) microwave) and non-ideal backhaul (i.e., typical backhaul widely used in the market such as xDSL, non-LOS (NLOS) microwave, and other backhauls like relaying) should be studied. The performance-cost trade-off should be taken into account.

A categorization of non-ideal backhaul based on operator inputs is listed in Table 1 below.

TABLE 1

| Backhaul Technology | Latency (One way) | Throughput | Priority (1 is the highest) |
|---|---|---|---|
| Fiber Access 1 | 10-30 ms | 10M-10 Gbps | 1 |
| Fiber Access 2 | 5-10 ms | 100-1000 Mbps | 2 |
| DSL Access | 15-60 ms | 10-100 Mbps | 1 |
| Cable | 25-35 ms | 10-100 Mbps | 2 |
| Wireless Backhaul | 5-35 ms | 10 Mbps-100 Mbps typical, maybe up to Gbps range | 1 |

A categorization of good to ideal backhaul based on operator inputs is listed in Table 2 below.

TABLE 2

| Backhaul Technology | Latency (One way) | Throughput | Priority (1 is the highest) |
|---|---|---|---|
| Fiber | 2-5 ms | 50M-10 Gbps | 1 |

For interfaces between macro and small cell, as well as between small cells, the studies should first identify which kind of information is needed or beneficial to be exchanged between nodes in order to get the desired improvements before the actual type of interface is determined. And if direct interface should be assumed between macro and small cell, as well as between small cell and small cell, X2 interface can be used as a starting point.

Small cell enhancement should consider sparse and dense small cell deployments. In some scenarios (e.g., hotspot indoor/outdoor places, etc.), single or a few small cell node(s) are sparsely deployed, e.g., to cover the hotspot(s). Meanwhile, in some scenarios (e.g., dense urban, large shopping mall, etc), a lot of small cell nodes are densely deployed to support huge traffic over a relatively wide area covered by the small cell nodes. The coverage of the small cell layer is generally discontinuous between different hotspot areas. Each hotspot area can be covered by a group of small cells, i.e., a small cell cluster.

Furthermore, smooth future extension/scalability (e.g., from sparse to dense, from small-area dense to large-area dense, or from normal-dense to super-dense) should be considered. For mobility/connectivity performance, both sparse and dense deployments should be considered with equal priority.

Both synchronized and un-synchronized scenarios should be considered between small cells as well as between small cells and macro cell(s). For specific operations, e.g., interference coordination, carrier aggregation and inter-eNB coordinated multipoint (COMP), small cell enhancement can benefit from synchronized deployments with respect to small cell search/measurements and interference/resource management. Therefore time synchronized deployments of small cell clusters are prioritized in the study and new means to achieve such synchronization shall be considered.

Small cell enhancement should address the deployment scenario in which different frequency bands are separately assigned to macro layer and small cell layer, respectively, where F1 and F2 in FIG. 7 correspond to different carriers in different frequency bands.

Small cell enhancement should be applicable to all existing and as well as future cellular bands, with special focus on higher frequency bands, e.g., the 3.5 GHz band, to enjoy the more available spectrum and wider bandwidth.

Small cell enhancement should also take into account the possibility for frequency bands that, at least locally, are only used for small cell deployments.

Co-channel deployment scenarios between macro layer and small cell layer should be considered as well.
Some example spectrum configurations are:
Carrier aggregation on the macro layer with bands X and Y, and only band X on the small cell layer
Small cells supporting carrier aggregation bands that are co-channel with the macro layer
Small cells supporting carrier aggregation bands that are not co-channel with the macro layer
One potential co-channel deployment scenario is dense outdoor co-channel small cells deployment, considering low mobility UEs and non ideal backhaul. All small cells are under the Macro coverage.

Small cell enhancement should be supported irrespective of duplex schemes (FDD/TDD) for the frequency bands for macro layer and small cell layer. Air interface and solutions for small cell enhancement should be band-independent, and aggregated bandwidth per small cell should be no more than 100 MHz, at least for 3GPP rel-12.

In a small cell deployment, it is likely that the traffic is fluctuating greatly since the number of users per small cell node is typically not so large due to small coverage.

In a small cell deployment, it is likely that the user distribution is very fluctuating between the small cell nodes. It is also expected that the traffic could be highly asymmetrical, either downlink or uplink centric.

Both uniform and non-uniform traffic load distribution in time-domain and spatial-domain should be considered. Non-full buffer and full buffer traffic are both included, and non-full buffer traffic is prioritized to verify the practical cases.

Backward compatibility, i.e., the possibility for legacy (pre-rel-12) UEs to access a small-cell node/carrier, is desirable for small cell deployments.

The introduction of non-backwards compatible features should be justified by sufficient gains.

For one feature of small cell enhancement, dual connectivity has been discussed. Dual connectivity is an operation where a given UE consumes radio resources provided by at least two different network points (master eNB (MeNB) and secondary eNB (SeNB)) connected with non-ideal backhaul while in RRC_CONNECTED. Furthermore, each eNB involved in dual connectivity for a UE may assume different roles. Those roles do not necessarily depend on the eNB's power class and can vary among UEs.

Practical deployment for small cells and handover in small cell deployment are described.

Figure 8:
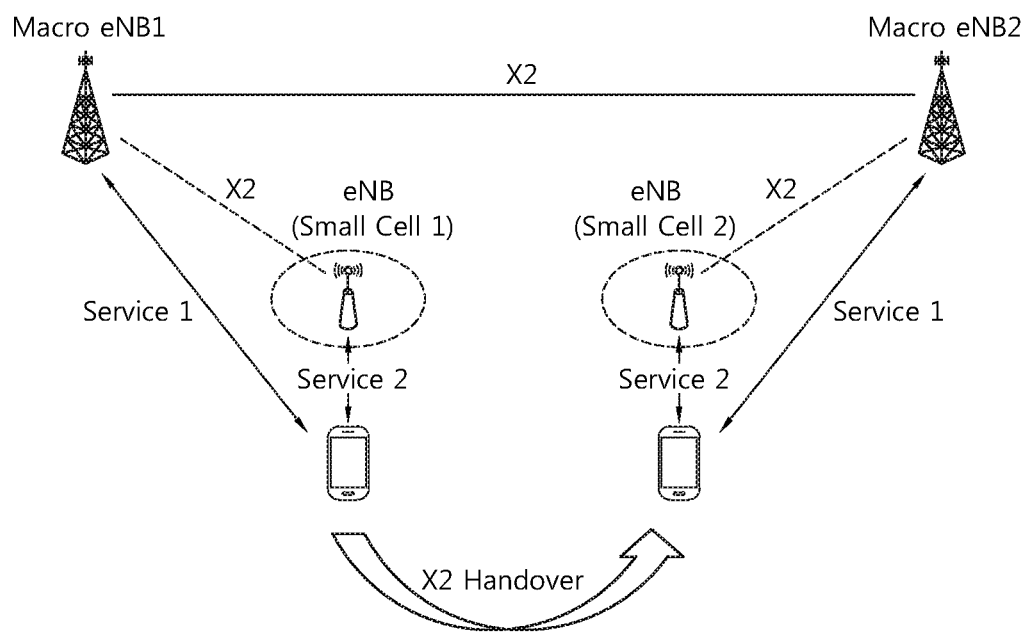
FIG. 8 shows an example of practical deployment of a small cell.

FIG. 8 shows an example of practical deployment of a small cell. The example described in FIG. 8 corresponds to a case of an X2 handover to other macro eNB with different small cells. Referring to FIG. 8, the UE receives two kinds of services by dual connectivity. The UE is connected to the macro eNB 1, and receives a service 1 from the macro eNB 1 directly. The UE is also connected to the small cell 1 which is controlled by the macro eNB 1, and receives a service 2 from the small cell 1. In a certain situation, for example, in the macro eNB coverage edge, X2 or S1 handover may happen. That is, the UE has to be handed over from the macro eNB 1 to another macro eNB, i.e., macro eNB 2. After handover, the UE is connected to the macro eNB 2, and receives the service 1 from the macro eNB 2 directly. The UE is also connected to the small cell 2 which is controlled by the macro eNB 2, and receives the service 2 from the small cell 2.

Figure 9:
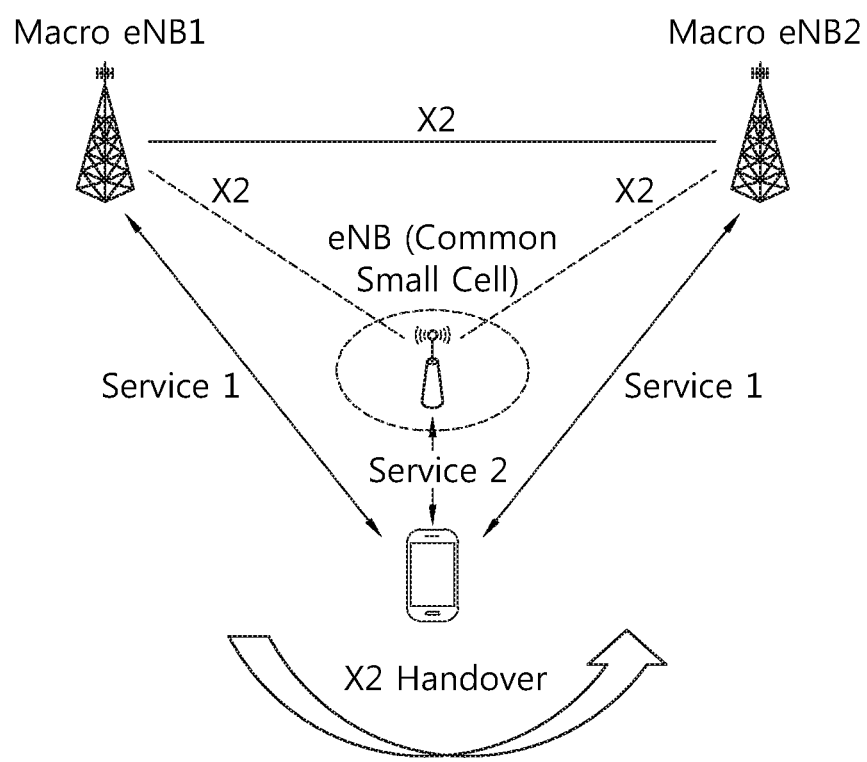
FIG. 9 shows another example of practical deployment of a small cell.

FIG. 9 shows another example of practical deployment of a small cell. The example described in FIG. 9 corresponds to a case of an X2 handover to other macro eNB with a common small cell. An example described in FIG. 9 is a special case of an example described in FIG. 8. Referring to FIG. 9, the UE receives two kinds of services by dual connectivity. The UE is connected to the macro eNB 1, and receives a service 1 from the macro eNB 1 directly. The UE is also connected to the common small cell which is shared by the macro eNB 1 and macro eNB 2, and receives a service 2 from the common small cell. After handover, the UE is connected to the macro eNB 2, and receives the service 1 from the macro eNB 2 directly. The UE is still connected to the common small cell, and receives the service 2 from the common small cell.

Figure 10:
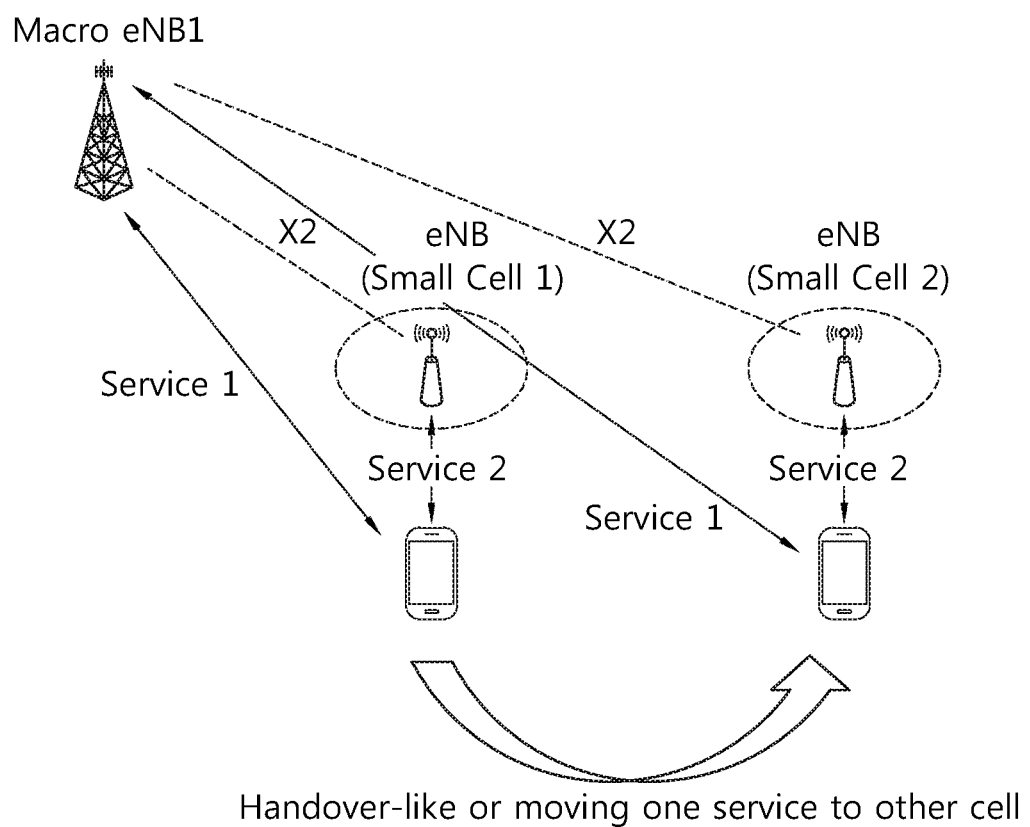
FIG. 10 shows another example of practical deployment of a small cell.

FIG. 10 shows another example of practical deployment of a small cell. The example described in FIG. 10 corresponds to a case of moving a service of a small cell to other small cell. Referring to FIG. 10, the UE receives two kinds of services by dual connectivity. The UE is connected to the macro eNB 1, and receives a service 1 from the macro eNB 1 directly. The UE is also connected to the small cell 1 which is controlled by the macro eNB 1, and receives a service 2 from the small cell 1. In a certain situation, especially when a large number of small cells are deployed within macro eNB coverage area, a handover-like behavior may happen. That is, the service 2, provided by the small cell 1, has to be moved to other small cell, while the service 1 is still provided by the macro eNB1. After handover-like procedure, the UE is still connected to the macro eNB 1, and receives the service 1 from the macro eNB 1 directly. The UE is also connected to the small cell 2 which is controlled by the macro eNB 1, and receives the service 2 from the small cell 2.

Figure 11:
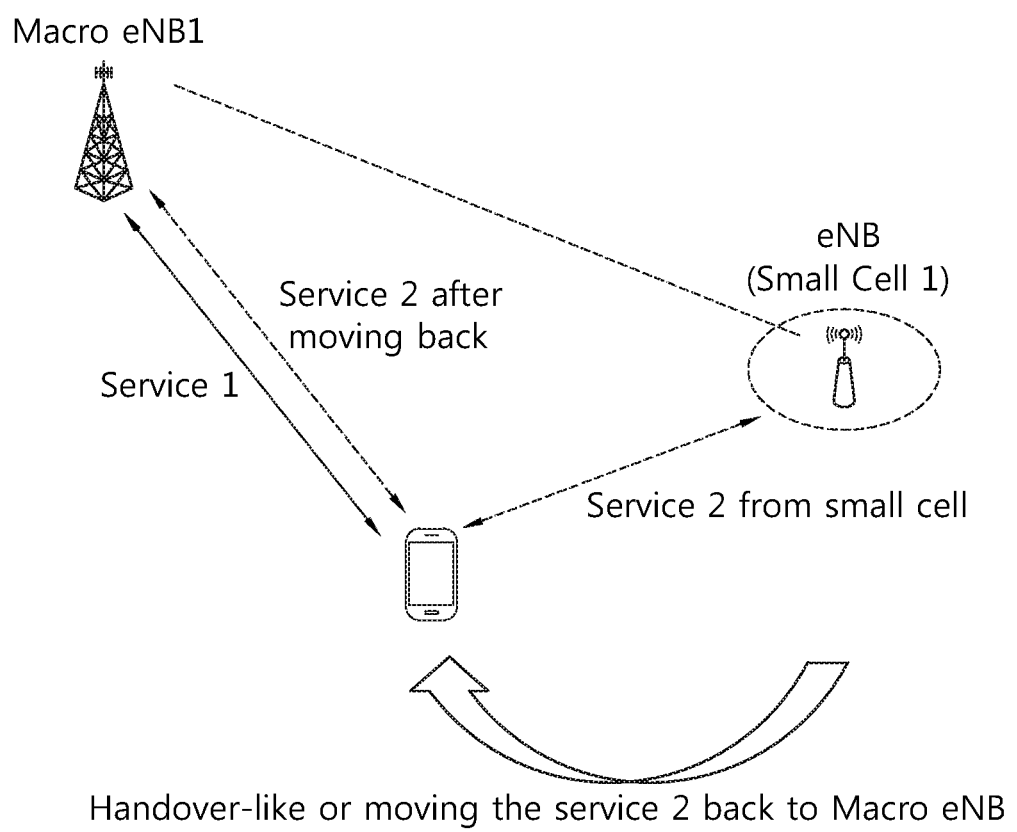
FIG. 11 shows another example of practical deployment of a small cell.

FIG. 11 shows another example of practical deployment of a small cell. The example described in FIG. 11 corresponds to a case of moving a service of a small cell to a macro eNB. An example described in FIG. 11 is also a special case of an example described in FIG. 8. Referring to FIG. 11, the UE receives two kinds of services by dual connectivity. The UE is connected to the macro eNB 1, and receives a service 1 from the macro eNB 1 directly. The UE is also connected to the small cell 1 which is controlled by the macro eNB 1, and receives a service 2 from the small cell 1. In a certain situation, for example when the UE is out of small cell coverage area, a handover-like behavior may happen. That is, the service 2, provided by the small cell 1, has to be moved back to the macro eNB 1, while the service 1 is still provided by the macro eNB1. After handover-like procedure, the UE is still connected to the macro eNB 1, and receives the service 1 and service 2 from the macro eNB 1 directly.

Data forwarding problems, which may happen according to practical deployment of small cells described in FIG. 8 to FIG. 11 above, are described.

Figure 12:
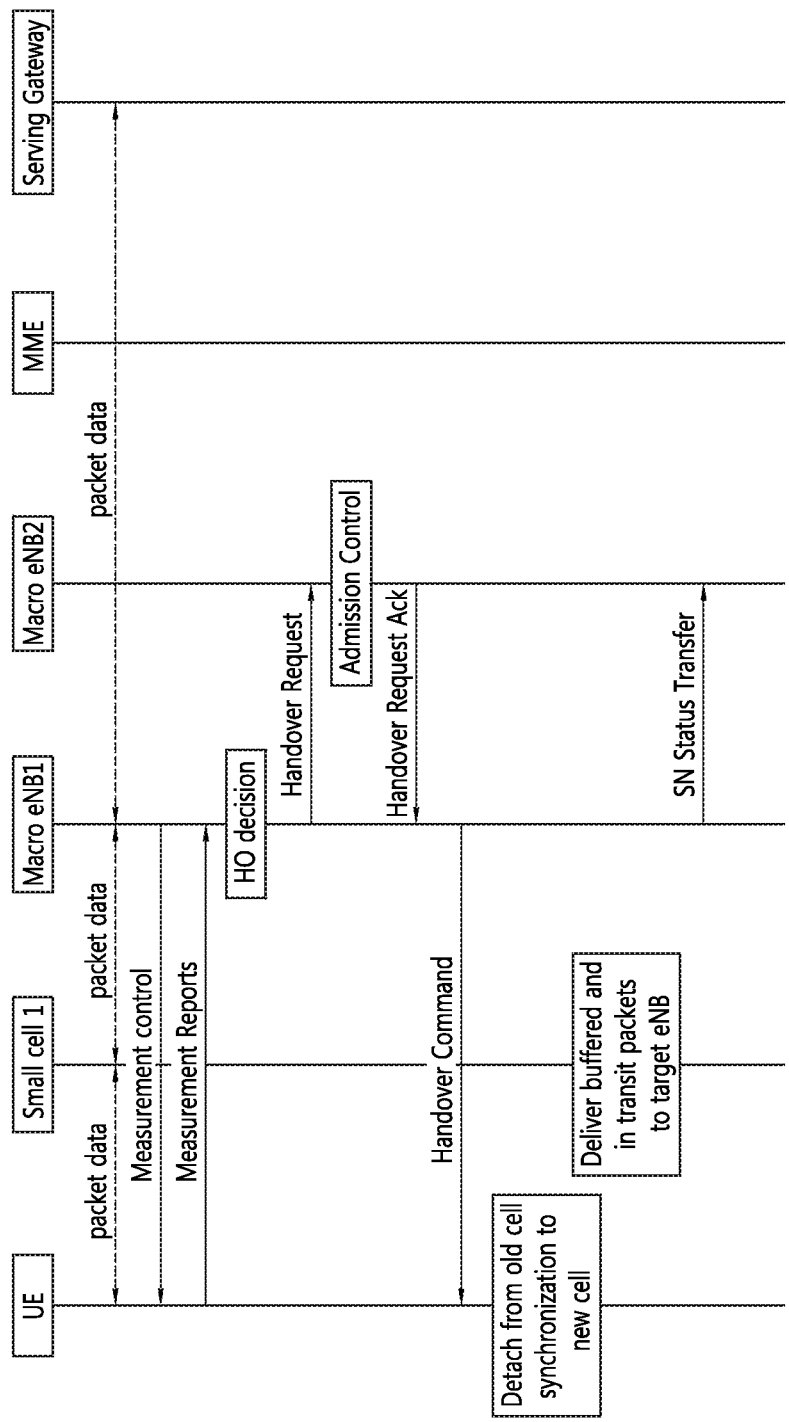
FIG. 12 and FIG. 13 show an example of a data forwarding problem according to practical deployment of a small cell.
Figure 13:
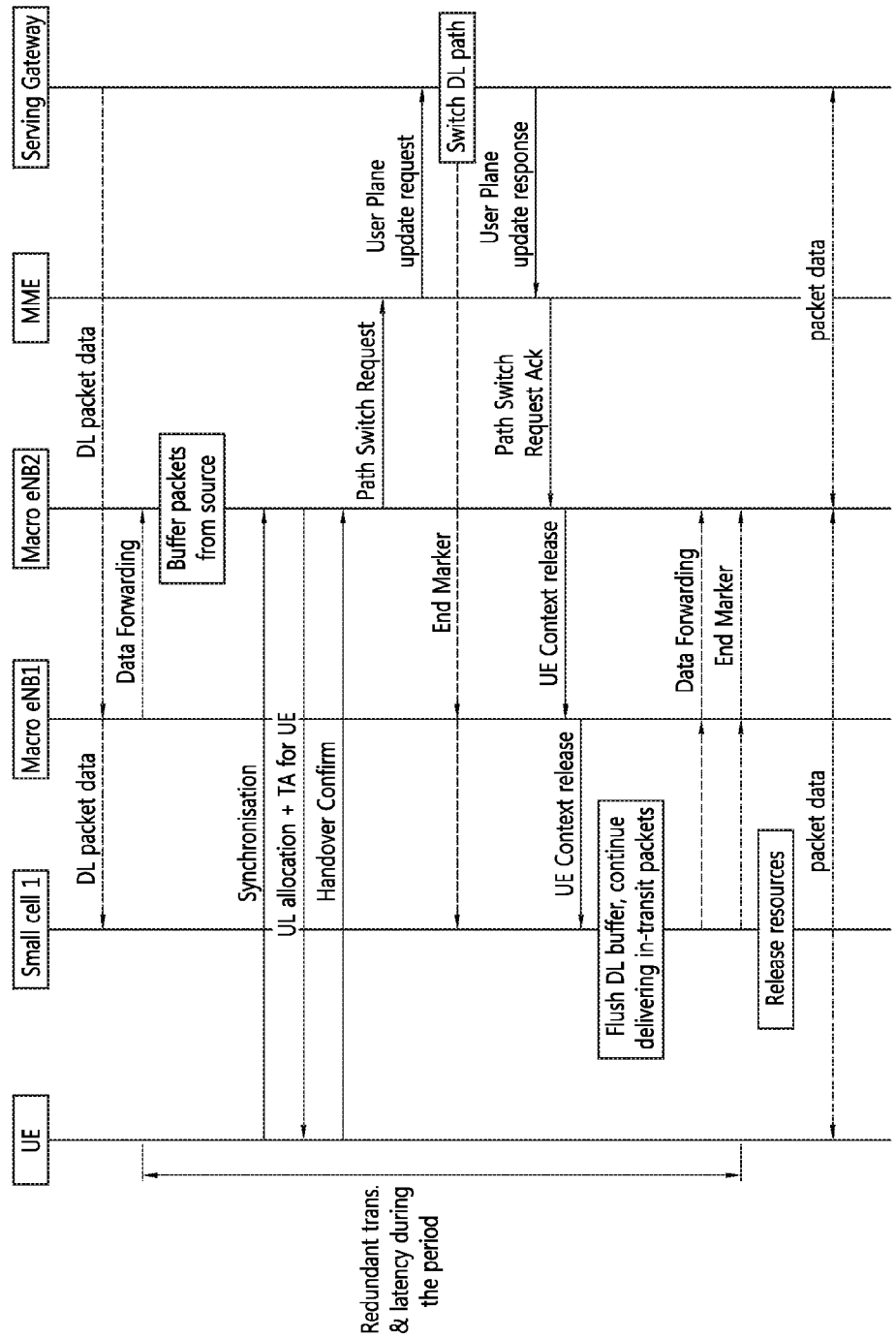

FIG. 12 and FIG. 13 show an example of a data forwarding problem according to practical deployment of a small cell. FIG. 12 and FIG. 13 show an X2 handover corresponding to a case described in FIG. 8 and FIG. 9, where the X2 handover procedure to other macro eNB is performed with different small cells or a common small cell. Referring to FIG. 12 and FIG. 13, the X2 handover procedure for small cell deployment is similar to the handover procedure described in FIG. 5 and FIG. 6 above, except that the small cell is deployed.

Comparing FIG. 12 with FIG. 5, since the small cell is deployed, packet data is exchanged between the UE and small cell, and between the small cell and macro eNB 1 (i.e., source eNB). Further, the small cell, not the macro eNB 1, delivers buffered and in transit packets to the macro eNB 2 (i.e., target eNB). Comparing FIG. 13 with FIG. 6, since the small cell is deployed, DL data packet is transmitted from the S-GW to the small cell via the macro eNB 1. Further, the end marker is transmitted from the S-GW to the small cell directly after the macro eNB 2 transmits a path switch request message to the MME. The macro eNB 1 forwards the UE context release message to the small cell, and upon receiving the UE context release message, the small cell flushes DL buffer, and continues delivering in-transit packets.

Data back and forth forwarding problem may happen since the end marker is transmitted from the S-GW to the small cell, only after the path switch request message is transmitted. By the data forwarding problem, redundant transmission of DL packet, between the macro eNB 1 and the small cell, may increase. This may be a waste of resources and may also increase data latency. It can be serious since the small cell may provide very high speed data service. The data packets which are forwarded back and forth would be very huge amount.

Figure 14:
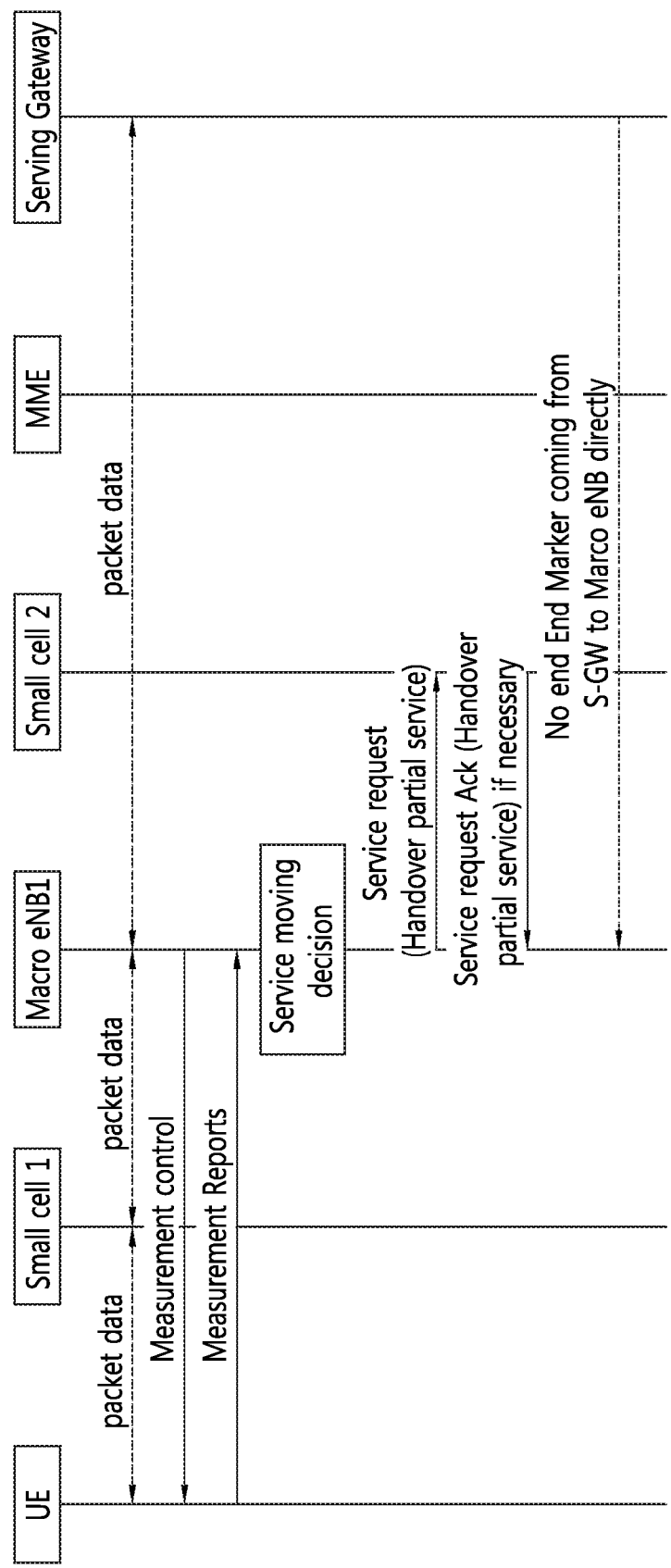
FIG. 14 shows another example of a data forwarding problem according to practical deployment of a small cell.

FIG. 14 shows another example of a data forwarding problem according to practical deployment of a small cell. FIG. 14 shows moving a service of a small cell to other small cell, which corresponds to a case described in FIG. 10. Referring to FIG. 14, the macro eNB 1 decides to move the service of the small cell 1 to the small cell 2, and transmits a service request, which indicates handover of a partial service, to the small cell 2. The small cell 2 transmits a service request acknowledge to the macro eNB 1, if necessary. However, the end marker is not transmitted from the S-GW to the macro eNB 1 directly. Therefore, the data forwarding problem may happen.

Figure 15:
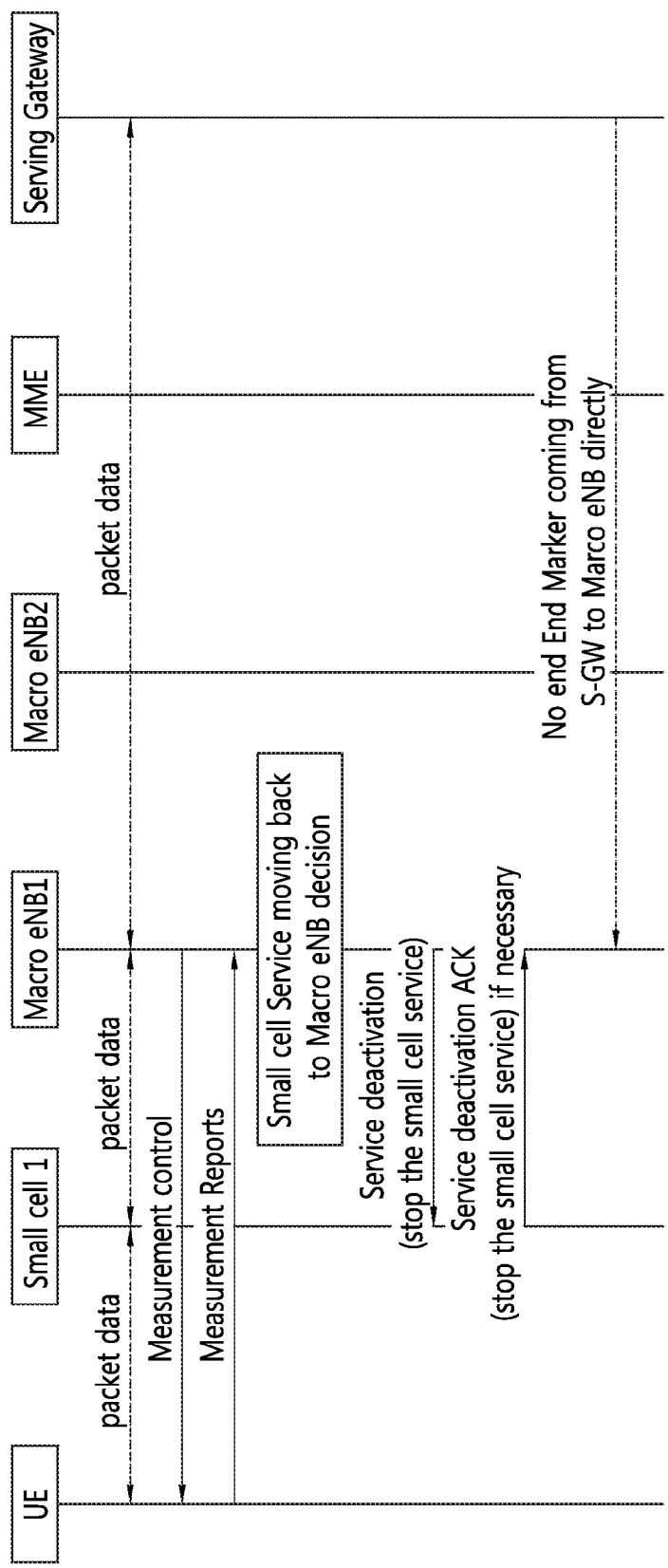
FIG. 15 shows another example of a data forwarding problem according to practical deployment of a small cell.

FIG. 15 shows another example of a data forwarding problem according to practical deployment of a small cell. FIG. 15 shows moving a service of a small cell to a macro eNB, which corresponds to a case described in FIG. 11. Referring to FIG. 15, the macro eNB 1 decides to move the service of the small cell back to the macro eNB 1, and transmits a service deactivation, which indicates stopping small cell service, to the small cell. The small cell 2 transmits a service deactivation acknowledge to the macro eNB 1, if necessary. However, the end marker does not transmitted from the S-GW to the macro eNB 1 directly. Therefore, the same data forwarding problem as described in FIG. 14 may happen.

In order to solve the data forwarding problem described above, the present invention provides a data forwarding method for small cell enhancement. According to embodiments of the present invention, a method for transmitting an indication is described. Hereinafter, various solutions corresponding to cases described in FIG. 12 to FIG. 15 are described.

Figure 16:
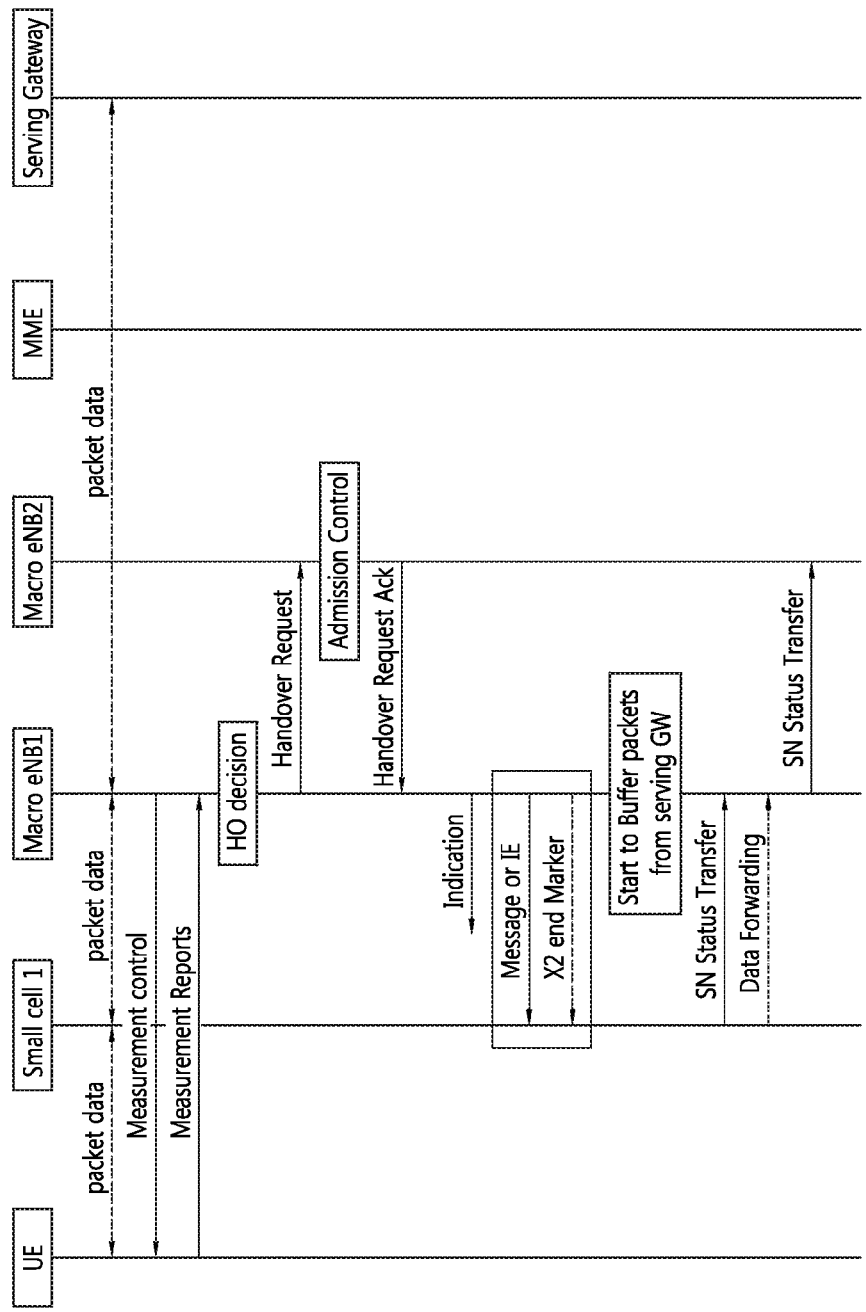
FIG. 16 and FIG. 17 show an example of a method for forwarding data according to an embodiment of the present invention.
Figure 17:
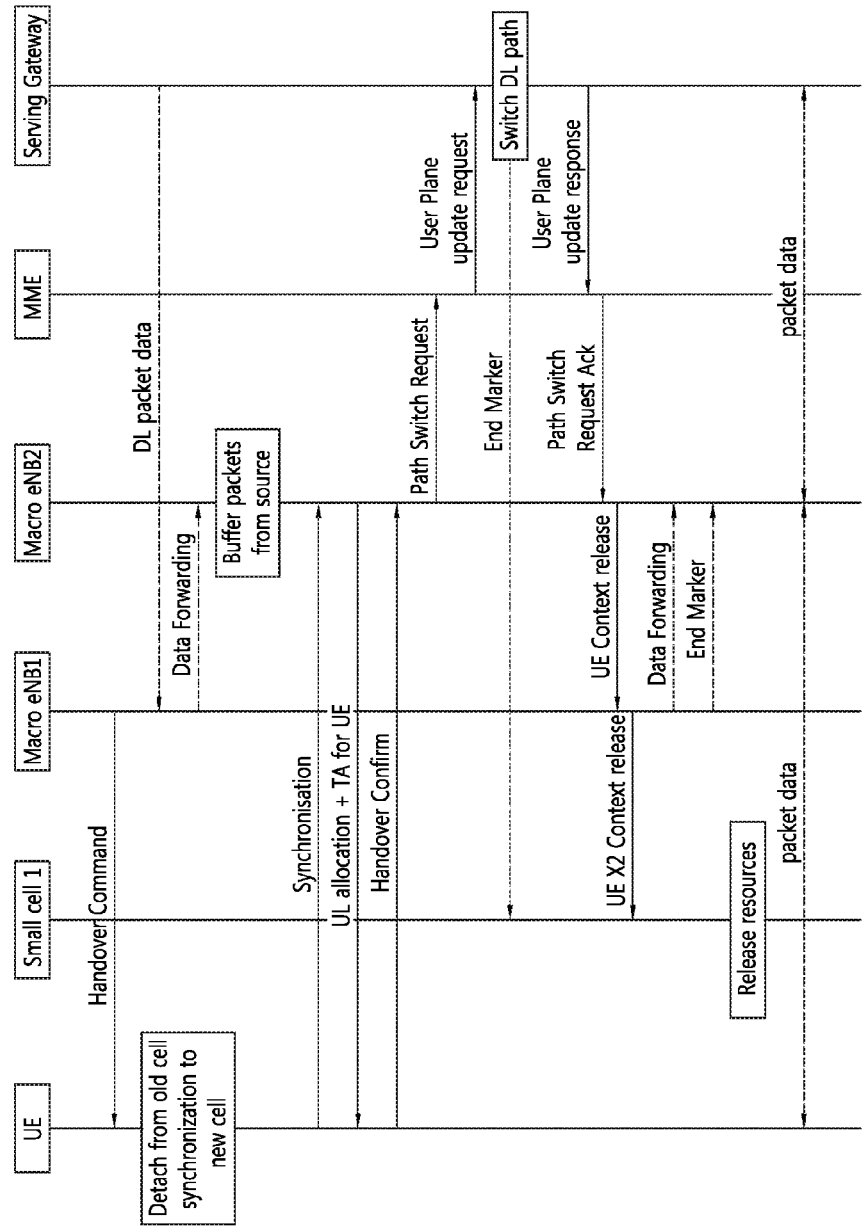

FIG. 16 and FIG. 17 show an example of a method for forwarding data according to an embodiment of the present invention. FIG. 16 and FIG. 17 show a solution for the data forwarding problem of a case described in FIG. 12 and FIG. 13.

Referring to FIG. 16, after the macro eNB 1 receives the handover request acknowledge message from the macro eNB 2, the macro eNB 1 may send an indication, which indicates stopping small cell service, to the small cell. The indication may be transmitted via the following possible ways.

Service deactivation message: The indication may be transmitted via the service deactivation message. Upon receiving the service deactivation message, the small cell may know that the data forwarding can be started. The service deactivation message may be an SeNB release message.

One information element (IE) of the service deactivation message: The indication may have transmitted via an IE in the service deactivation message. The IE may be a downlink GPRS tunneling protocol (GTP) tunnel endpoint or an uplink GTP tunnel endpoint, which is generated by the macro eNB. Upon receiving the IE in the service deactivation message, the small cell may know that the data forwarding can be started. The service deactivation message may be an SeNB release message.

Independent message or IE in other message: The indication may be transmitted via an independent message, e.g., data forwarding request message, or may have a form of an IE in other message. Upon receiving the independent message or IE in other message, the small cell may know that the data forwarding can be started.

X2 end marker generated by the macro eNB 1 (User plane): The X2 end marker is used for notifying the small cell of stopping small cell service. The X2 end marker may also take the role of the end marker, which means that the macro eNB 1 can know the end of data forwarding from the small cell.

The X2 end maker generated by the macro eNB 1 may also be necessary when the indication is transmitted via a message or an IE in the message. In this case, the X2 end marker may take the role of original end marker. Thus, upon receiving the X2 end marker back, the macro eNB 1 can know the end of data forwarding from the small cell. If end marker is not transmitted, a timer in the macro eNB 1 may be necessary to give a time duration for data forwarding in X2 interface.

The X2 end marker may be transmitted right after the handover request acknowledge message is received from the macro eNB 2. Further, the X2 end marker may be transmitted before or after the indication is transmitted to the small cell.

The macro eNB 1 may start to buffer the data packets receiving from the S-GW right after the X2 end marker is transmitted, or the indication is transmitted. The data forwarding may start from the small cell after the small cell receives the indication, with an SN status transfer message.

Referring to FIG. 17, the macro eNB 1 may transmit a UE X2 context release message to the small cell. By receiving the UE X2 context release message, the small cell can release radio and control plane related resources associated to the UE context.

Figure 18:
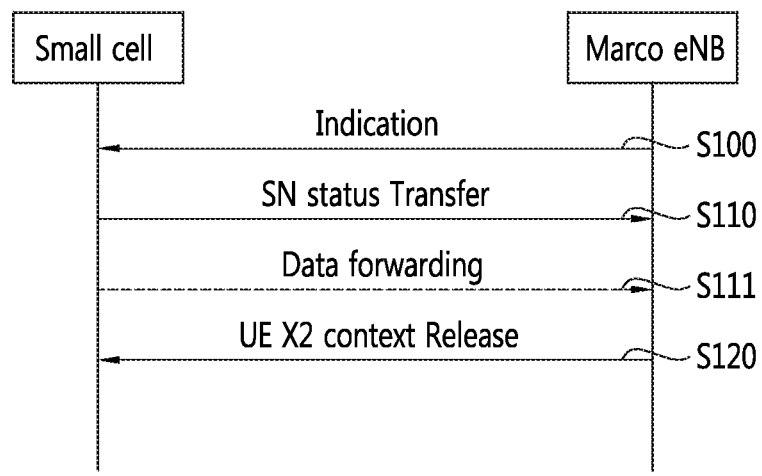
FIG. 18 shows another example of a method for forwarding data according to an embodiment of the present invention.

FIG. 18 shows another example of a method for forwarding data according to an embodiment of the present invention. FIG. 18 shows a brief procedure of the procedure described in FIG. 16 and FIG. 17.

In step S100, the macro eNB transmits an indication which indicates stopping serving a small cell service to the small cell. The indication may be received via a service deactivation message or an SeNB release message. Alternatively, the indication may be received via an IE in a service deactivation message or in an SeNB release message. The IE may be a downlink GTP tunnel endpoint or an uplink GTP tunnel endpoint, which is generated by the macro eNB. Alternatively, the indication may be received via an X2 end marker.

In step S110, upon receiving the indication, the small cell transmits an SN status transfer message to the macro eNB. In step S111, the small cell transmits forwards data to the macro eNB to the macro eNB together with the SN status transfer message.

In step S120, the macro eNB transmits a UE X2 context release message to the small cell.

Figure 19:
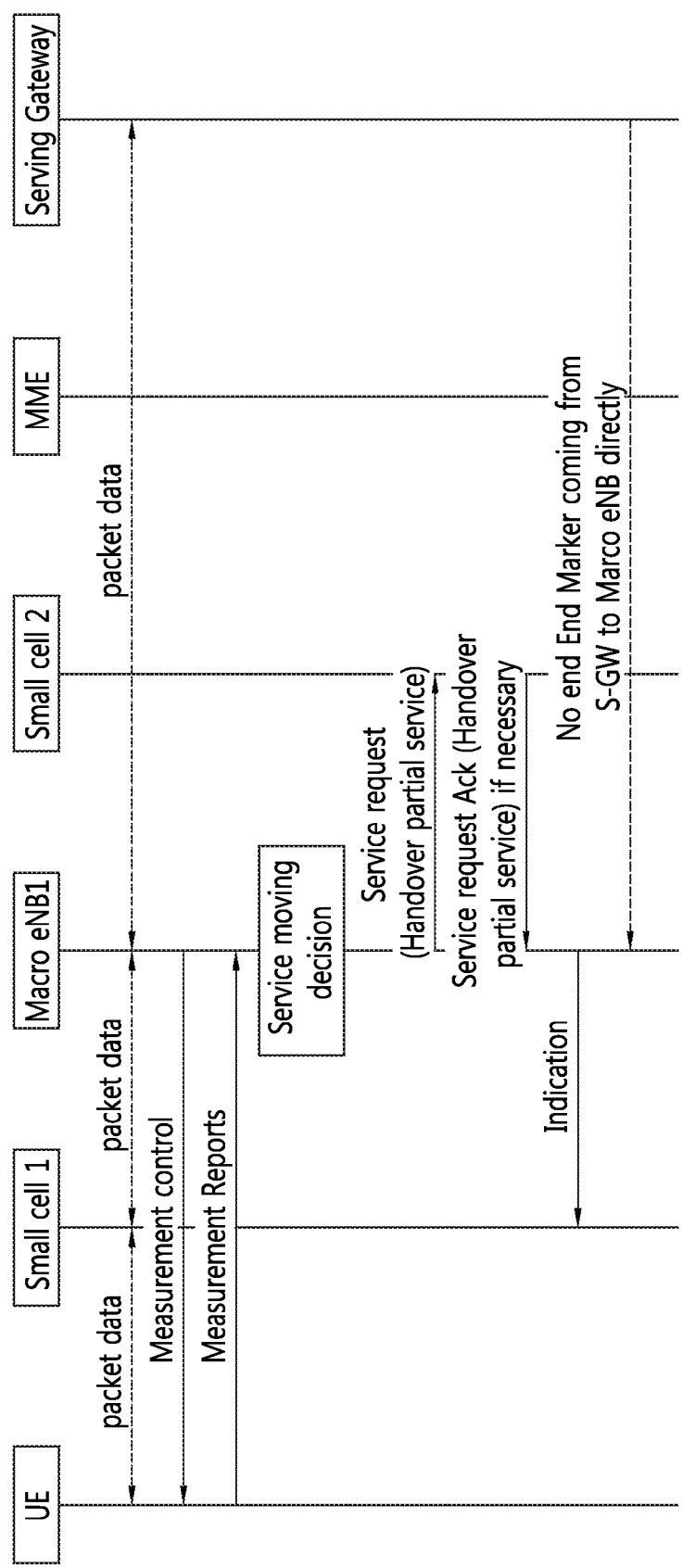
FIG. 19 shows another example of a method for forwarding data according to an embodiment of the present invention.

FIG. 19 shows another example of a method for forwarding data according to an embodiment of the present invention. FIG. 19 shows a solution for the data forwarding problem of a case described in FIG. 14.

Referring to FIG. 19, after the macro eNB 1 makes a decision to move a small cell service from the small cell 1 to the small cell 2, the macro eNB 1 may send an indication, which indicates stopping the small cell service, to the small cell 1. The indication may be transmitted after or before the service request message sent to the small cell 2. The indication may be transmitted via the following possible ways.

Service deactivation message: The indication may be transmitted via the service deactivation message. Upon receiving the service deactivation message, the small cell 1 may know that the data forwarding can be started. The service deactivation message may be an SeNB release message.

One IE of the service deactivation message: The indication may have transmitted via an IE in the service deactivation message. Upon receiving the IE in the service deactivation message, the small cell 1 may know that the data forwarding can be started. The service deactivation message may be an SeNB release message.

Independent message or IE in other message: The indication may be transmitted via an independent message, e.g., data forwarding request message, or may have a form of an IE in other message. Upon receiving the independent message or IE in other message, the small cell 1 may know that the data forwarding can be started.

X2 end marker generated by the macro eNB 1 (User plane): The X2 end marker is used for notifying the small cell 1 of stopping the small cell service. The X2 end marker may also take the role of the end marker, which means that the macro eNB 1 can know the end of data forwarding from the small cell 1.

The X2 end maker generated by the macro eNB 1 may also be necessary when the indication is transmitted via a message or an IE in the message. In this case, the X2 end marker may take the role of original end marker. Thus, upon receiving the X2 end marker back, the macro eNB 1 can know the end of data forwarding from the small cell 1.

The X2 end marker may be transmitted just after the macro eNB 1 makes decision of moving the small cell service, or before or after the service request message is transmitted to the small cell 2.

The macro eNB 1 may start to buffer the data packets receiving from the S-GW right after the X2 end marker is transmitted, or the indication is transmitted.

Figure 20:
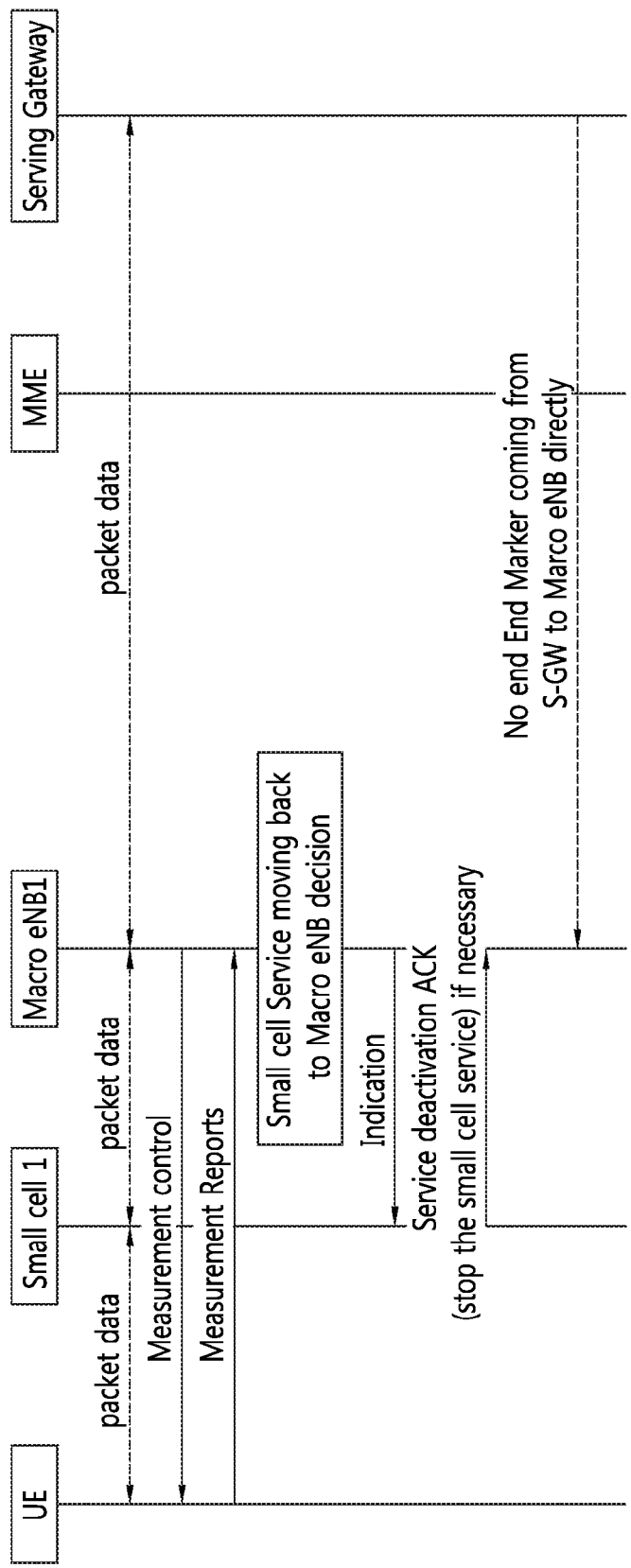
FIG. 20 shows another example of a method for forwarding data according to an embodiment of the present invention.

FIG. 20 shows another example of a method for forwarding data according to an embodiment of the present invention. FIG. 20 shows a solution for the data forwarding problem of a case described in FIG. 15.

Referring to FIG. 20, after the macro eNB 1 makes a decision to move a small cell service from the small cell back to the macro eNB 1, the macro eNB 1 may send an indication, which indicates stopping the small cell service, to the small cell. The indication may be transmitted via the following possible ways.

Service deactivation message: The indication may be transmitted via the service deactivation message. Upon receiving the service deactivation message, the small cell may know that the data forwarding can be started. The service deactivation message may be an SeNB release message.

One IE of the service deactivation message: The indication may have transmitted via an IE in the service deactivation message. Upon receiving the IE in the service deactivation message, the small cell may know that the data forwarding can be started. The service deactivation message may be an SeNB release message.

Independent message or IE in other message: The indication may be transmitted via an independent message, e.g., data forwarding request message, or may have a form of an IE in other message. Upon receiving the independent message or IE in other message, the small cell may know that the data forwarding can be started.

X2 end marker generated by the macro eNB 1 (User plane): The X2 end marker is used for notifying the small cell of stopping the small cell service. The X2 end marker may also take the role of the end marker, which means that the macro eNB 1 can know the end of data forwarding from the small cell.

The X2 end maker generated by the macro eNB 1 may also be necessary when the indication is transmitted via a message or an IE in the message. In this case, the X2 end marker may take the role of original end marker. Thus, upon receiving the X2 end marker back, the macro eNB 1 can know the end of data forwarding from the small cell.

The X2 end marker may be transmitted before or after transmitting the service deactivation message, or after moving the small cell service back to the macro eNB 1 is approved.

The macro eNB 1 may start to buffer the data packets receiving from the S-GW right after the X2 end marker is transmitted, or the indication is transmitted.

Figure 21:
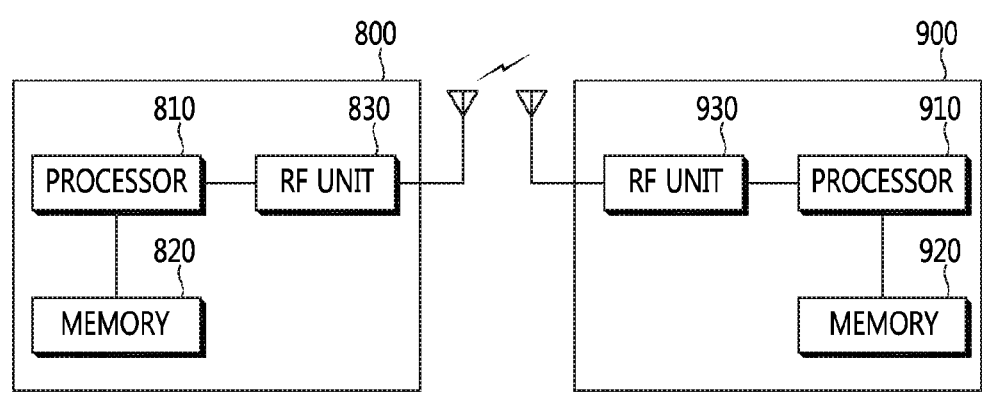
FIG. 21 shows a wireless communication system to implement an embodiment of the present invention.

FIG. 21 shows a wireless communication system to implement an embodiment of the present invention.

An MeNB 800 includes a processor 810, a memory 820, and a radio frequency (RF) unit 830. The processor 810 may be configured to implement proposed functions, procedures, and/or methods in this description. Layers of the radio interface protocol may be implemented in the processor 810. The memory 820 is operatively coupled with the processor 810 and stores a variety of information to operate the processor 810. The RF unit 830 is operatively coupled with the processor 810, and transmits and/or receives a radio signal.

An SeNB or a UE 900 includes a processor 910, a memory 920 and an RF unit 930. The processor 910 may be configured to implement proposed functions, procedures and/or methods described in this description. Layers of the radio interface protocol may be implemented in the processor 910. The memory 920 is operatively coupled with the processor 910 and stores a variety of information to operate the processor 910. The RF unit 930 is operatively coupled with the processor 910, and transmits and/or receives a radio signal.

The processors 810, 910 may include application-specific integrated circuit (ASIC), other chipset, logic circuit and/or data processing device. The memories 820, 920 may include read-only memory (ROM), random access memory (RAM), flash memory, memory card, storage medium and/or other storage device. The RF units 830, 930 may include baseband circuitry to process radio frequency signals. When the embodiments are implemented in software, the techniques described herein can be implemented with modules (e.g., procedures, functions, and so on) that perform the functions described herein. The modules can be stored in memories 820, 920 and executed by processors 810, 910. The memories 820, 920 can be implemented within the processors 810, 910 or external to the processors 810, 910 in which case those can be communicatively coupled to the processors 810, 910 via various means as is known in the art.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope and spirit of the present disclosure.

What is claimed is:

1. A method for forwarding, by a secondary evolved NodeB (SeNB) which controls a small cell in dual connectivity, data in a wireless communication system, the method comprising:
   receiving, from a macro eNodeB (eNB), a SeNB release request message that includes an indication which indicates stopping serving a small cell service; and
   upon receiving the SeNB release message including the indication, starting to forward data to the macro eNB,
   wherein the indication in the SeNB release message is a downlink (DL) general packet radio services (GPRS) tunneling protocol (GTP) tunnel endpoint information element (IE) or an uplink (UL) GTP tunnel endpoint IE.

2. The method of claim 1, further comprising:
   transmitting a sequence number (SN) status transfer message with the data to the macro eNB.

3. The method of claim 1, further comprising:
   receiving an X2 end marker, generated by the macro eNB, from the macro eNB.

4. The method of claim 1, further comprising:
   receiving a UE X2 context release message from the macro eNB.

5. The method of claim 4, further comprising:
   releasing radio and control plane related resources associated to a UE context, upon receiving the UE X2 context release message.

6. The method of claim 1, wherein the SeNB release message is received before the macro eNB transmits a service request message to a second eNB.

7. The method of claim 1, wherein the SeNB release message is received after the macro eNB transmits a service request message to a second eNB.

8. A method for transmitting, by a macro eNodeB (eNB) in dual connectivity, an indication in a wireless communication system, the method comprising:
   transmitting, to a secondary eNB (SeNB) which controls a small cell in dual connectivity, a SeNB release message that includes an indication which indicates stopping serving a small cell service; and
   receiving forwarded data from the SeNB,
   wherein the indication in the SeNB release message is a downlink (DL) general packet radio services (GPRS) tunneling protocol (GTP) tunnel endpoint or an uplink (UL) GTP tunnel endpoint.

9. The method of claim 8, further comprising:
   generating an X2 end marker; and
   transmitting the generated X2 end marker to the SeNB.

10. The method of claim 8, further comprising:
    transmitting a UE X2 context release message to the SeNB.

11. The method of claim 8, further comprising:
    receiving a sequence number (SN) status transfer message from the SeNB.

12. The method of claim 8, wherein the SeNB release message is transmitted before transmitting a service request message to a second eNB.

13. The method of claim 8, wherein the SeNB release message is transmitting after transmitting a service request message to a second eNB.

14. The method of claim 8, further comprising:
    starting to buffer data packets received from a serving gateway (S-GW) right after the indication is transmitted.

* * * * *